(12) United States Patent
Abdo et al.

(10) Patent No.: US 11,120,241 B2
(45) Date of Patent: Sep. 14, 2021

(54) TWO DIMENSIONAL BARCODE PROVIDED WITH DYNAMIC ENVIRONMENTAL INDICATOR PROVIDED WITHIN A GAP

(71) Applicant: Temptime Corporation, Morris Plains, NJ (US)

(72) Inventors: Mohannad Abdo, Clifton, NJ (US); Clive Hohberger, Highland Park, IL (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 52 days.

(21) Appl. No.: 16/526,505

(22) Filed: Jul. 30, 2019

(65) Prior Publication Data

US 2021/0034831 A1 Feb. 4, 2021

(51) Int. Cl.
*G06K 7/14* (2006.01)
*G06K 19/06* (2006.01)

(52) U.S. Cl.
CPC ....... *G06K 7/1473* (2013.01); *G06K 19/0614* (2013.01); *G06K 19/06037* (2013.01); *G06K 19/06075* (2013.01)

(58) Field of Classification Search
CPC .. G06K 7/1473; G06K 7/1417; G06K 7/1434; G06K 19/06037; G06K 19/06075
USPC ......................... 235/462.01, 462.09
See application file for complete search history.

(56) References Cited

U.S. PATENT DOCUMENTS

2016/0292486 A1* 10/2016 Prusik .............. G06K 19/06046
2017/0193260 A1* 7/2017 Prusik .................. G06K 7/1473

* cited by examiner

*Primary Examiner* — Paultep Savusdiphol
(74) *Attorney, Agent, or Firm* — K&L Gates LLP

(57) ABSTRACT

A sensor-augmented two-dimensional barcode includes a layer provided on a substrate comprising a two-dimensional error-correcting barcode symbol. The bar code symbol further includes a barcode region, an empty region, and a dynamic region. The barcode region includes a plurality of modules in a static color state and the empty region has an area. Additionally, the dynamic region is provided on the substrate and positioned within the area of the empty region. The dynamic region includes a dynamic indicator having a chemistry that is configured, responsive to the occurrence of an environmental condition, to undergo a chemical or physical state change between an initial state and an end state, causing a change in the color state of the dynamic indicator. Additionally, the color state indicates exposure to the environmental condition.

41 Claims, 12 Drawing Sheets

Inactivated Polio Vaccine

*Tests Passed*

| | |
|---|---|
| Monitor Category: | VVM7 |
| Remaining Life: | 80% |
| Expiration Date: | 2019-12-31 |
| Product Authenticity: | ✓ OK |
| GTIN: | 10123451234512 |
| Batch Number: | 16R00150 |
| Serial Number: | 1234 |

FIG. 9

Inactivated Polio Vaccine

*Tests Failed*

Monitor Category:     VVM7

Remaining Life:       0%

Expiration Date:      2019-12-31

Product Authenticity:  ✓ OK

GTIN:            *10123451234512*

Batch Number:    *16R00150*

Serial Number:   *1234*

FIG. 10

TWO DIMENSIONAL BARCODE PROVIDED WITH DYNAMIC ENVIRONMENTAL INDICATOR PROVIDED WITHIN A GAP

BACKGROUND

A barcode is an optical machine-readable representation of data. A two-dimensional (2D) barcode (e.g., Data Matrix or QR Code), is a two-dimensional way to represent information in a bar code. Black and white 2D barcodes can represent more data per unit area than one-dimensional (i.e., linear) barcodes (e.g., Code 39 or Code 128). Data recovery from barcodes may be system critical and many 2D barcode technologies provide robust error correction capabilities. Typically, using multiple linked barcodes or larger sized barcodes may increase data recovery capabilities. However, space available for barcodes may be limited in many aspects. Moreover, the current barcode technology may be improved upon as presently disclosed.

SUMMARY

The present disclosure provides a new and innovative system, methods and apparatus for providing and reading 2D barcodes that include dynamic environmental data that is provided within an empty space or gap within the 2D barcode (e.g., the dynamic environmental data is not underprinted or overprinted by static ink), where modules of the barcode may continuously (as contrasted with step-wise) change color state in response to environmental conditions. In light of the disclosure herein and without limiting the disclosure in any way, in an aspect of the present disclosure, which may be combined with any other aspect listed herein unless specified otherwise, a sensor-augmented two-dimensional barcode includes a layer provided on a substrate comprising a two-dimensional error-correcting barcode symbol. The bar code symbol further includes a barcode region, an empty region, and a dynamic region. The barcode region includes a plurality of modules in a static color state and the empty region has an area. Additionally, the dynamic region is provided on the substrate and positioned within the area of the empty region. The dynamic region includes a dynamic indicator having a chemistry that is configured, responsive to the occurrence of an environmental condition, to undergo a chemical or physical state change between an initial state and an end state, causing a change in the color state of the dynamic indicator. Additionally, the color state indicates exposure to the environmental condition.

In accordance with another exemplary aspect of the present disclosure, which may be used in combination with any one or more of the preceding aspects, the two-dimensional error-correcting barcode symbol is valid when the dynamic indicator is in the initial state.

In accordance with another exemplary aspect of the present disclosure, which may be used in combination with any one or more of the preceding aspects, the two-dimensional error-correcting barcode symbol is valid when the dynamic indicator is in an intermediate state between the initial state and the end state.

In accordance with another exemplary aspect of the present disclosure, which may be used in combination with any one or more of the preceding aspects, the two-dimensional error-correcting barcode symbol is valid when the dynamic indicator is in the end state.

In accordance with another exemplary aspect of the present disclosure, which may be used in combination with any one or more of the preceding aspects, the empty region may be positioned in an invariant area of the two-dimensional barcode.

In accordance with another exemplary aspect of the present disclosure, which may be used in combination with any one or more of the preceding aspects, the invariant area is a region of the sensor-enhanced barcode symbol in which the underlying data does not change between barcode symbols identifying similar products, for example, is an unchanging group of number files, and therefore the barcode module pattern in the invariant area does not change between similar products.

In accordance with another exemplary aspect of the present disclosure, which may be used in combination with any one or more of the preceding aspects, the invariant area occupies a first quantity of modules and the empty region occupies a second quantity of modules. The invariant area is configured to be corrected by a predefined quantity of error correcting codewords. Additionally, the empty region is shaped such that the second quantity of modules is configured to be corrected by a subset of the predefined quantity of error correcting codewords.

In accordance with another exemplary aspect of the present disclosure, which may be used in combination with any one or more of the preceding aspects, the second quantity is equal to or less than the first quantity.

In accordance with another exemplary aspect of the present disclosure, which may be used in combination with any one or more of the preceding aspects, the dynamic region occupies less than the empty region, and therefore the empty region forms a buffer region between the dynamic region and the barcode region.

In accordance with another exemplary aspect of the present disclosure, which may be used in combination with any one or more of the preceding aspects, the buffer region has the width of at least one module.

In accordance with another exemplary aspect of the present disclosure, which may be used in combination with any one or more of the preceding aspects, the dynamic region has a shape that is adapted to be visually distinguishable and perceivable by a human user. The shape provides a human visible indication of a status of the two-dimensional barcode.

In accordance with another exemplary aspect of the present disclosure, which may be used in combination with any one or more of the preceding aspects, the empty region is configured such that the dynamic region corresponds to a predetermined quantity of modules.

In accordance with another exemplary aspect of the present disclosure, which may be used in combination with any one or more of the preceding aspects, the environmental condition is selected from the group consisting of time, temperature, and time-temperature product.

In accordance with another exemplary aspect of the present disclosure, which may be used in combination with any one or more of the preceding aspects, the dynamic indicator undergoes a continuous chemical or physical state change.

In accordance with another exemplary aspect of the present disclosure, which may be used in combination with any one or more of the preceding aspects, the dynamic indicator continuously changes color state between the initial state and the end state when exposed to the environmental condition.

In accordance with another exemplary aspect of the present disclosure, which may be used in combination with any one or more of the preceding aspects, the dynamic indicator may undergo an irreversible binary change between the initial state and the end state when exposed to a threshold level of the environmental condition.

In accordance with another exemplary aspect of the present disclosure, which may be used in combination with any one or more of the preceding aspects, the two-dimensional error-correcting barcode symbol is from the symbology group consisting of Data Matrix, QR Code, Aztec Code, MaxiCode, PDF417 and Dot Code symbologies.

In accordance with another exemplary aspect of the present disclosure, which may be used in combination with any one or more of the preceding aspects, the two-dimensional error-correcting barcode symbol utilizes Reed-Solomon error correction.

In accordance with another exemplary aspect of the present disclosure, which may be used in combination with any one or more of the preceding aspects, the dynamic indicator is initially in a first color state when unactivated and dynamically changes to a plurality of different color states within a range between the initial state and the end state before reaching the end state.

In accordance with another exemplary aspect of the present disclosure, which may be used in combination with any one or more of the preceding aspects, the dynamic indicator reaches an intermediate state between the initial state and the end state when the specified condition of the sensed property is beyond a threshold value. The threshold value is preferably a labeled product life.

In accordance with another exemplary aspect of the present disclosure, which may be used in combination with any one or more of the preceding aspects, the dynamic indicator dynamically changes to a plurality of different color states related to one of expended product life and remaining labeled product life.

In accordance with another exemplary aspect of the present disclosure, which may be used in combination with any one or more of the preceding aspects, the dynamic region provides sensor digital information, the sensor digital information preferably encoded in an invariant pixel map of the two-dimensional symbol.

In accordance with another exemplary aspect of the present disclosure, which may be used in combination with any one or more of the preceding aspects, the barcode region is an error correcting code, preferably chosen from the group consisting of Hamming Codes, Bose-Chaudhuri-Hocquenghem Codes, Golay Codes, Simplex Codes, Reed-Muller Codes, Fire Codes, Convolutional Codes, and Reed-Solomon Codes.

In accordance with another exemplary aspect of the present disclosure, which may be used in combination with any one or more of the preceding aspects, the two-dimensional error-correcting barcode includes encoded data identifiers, a first data identifier indicates the size and location of the dynamic region and a second data identifier indicates product life equation parameters. Additionally, the product life equation parameters may be Arrhenius equation parameters.

In accordance with another exemplary aspect of the present disclosure, which may be used in combination with any one or more of the preceding aspects, the two-dimensional error-correcting barcode includes encoded Application Identifiers, a first Application Identifier indicates the size and location of the dynamic region and a second Application Identifier indicates product life equation parameters. Additionally, the product life equation parameters may be Arrhenius equation parameters.

In accordance with another exemplary aspect of the present disclosure, which may be used in combination with any one or more of the preceding aspects, the first data identifier and the second data identifier are the same data identifier.

In accordance with another exemplary aspect of the present disclosure, which may be used in combination with any one or more of the preceding aspects, the first Application Identifier and the second Application Identifier are the same Application Identifier.

In another aspect of the present disclosure, which may be combined with any other aspect listed herein unless specified otherwise, a sensor-augmented two-dimensional barcode includes a two-dimensional error-correcting barcode symbol comprising a barcode region, an empty region, and a dynamic region. The barcode region includes a plurality of modules in a static color state occupying a first area and the empty region having an area. The dynamic region is positioned within the area of the empty region and occupies a second area. Additionally, the dynamic region includes a dynamic indicator having a chemistry that is configured, responsive to the occurrence of an environmental condition, to undergo a chemical or physical state change between an initial state and an end state, causing a change in the color state of the dynamic indicator. The color state indicates exposure to the environmental condition.

In accordance with another exemplary aspect of the present disclosure, which may be used in combination with any one or more of the preceding aspects, the barcode region has a length and a width.

In accordance with another exemplary aspect of the present disclosure, which may be used in combination with any one or more of the preceding aspects, the first area is between a range of 10 square modules and 20,736 square modules.

In accordance with another exemplary aspect of the present disclosure, which may be used in combination with any one or more of the preceding aspects, the second area is between a range of 4 square modules and 36 square modules.

In accordance with another exemplary aspect of the present disclosure, which may be used in combination with any one or more of the preceding aspects, the second area of dynamic region is the minimum area to accommodate a VVM, and the first area is at least the minimum area to accommodate error correction for the second area.

In another aspect of the present disclosure, which may be combined with any other aspect listed herein unless specified otherwise, an article of manufacture includes a pharmaceutical, biological, or food product, preferably a vaccine. The article of manufacture also includes a container labeled or directly marked with a sensor-augmented two-dimensional barcode. The container holds the pharmaceutical, biological, or food product, and is preferably a vaccine vial. Additionally, the barcode is provided on or in the container, and is preferably applied to the outside surface of the container.

In another aspect of the present disclosure, which may be combined with any other aspect listed herein unless specified otherwise, a method of reading of a sensor-augmented two-dimensional barcode symbol includes optically scanning an image of the sensor-augmented two-dimensional barcode symbol to obtain color values for pixels in the image. The two-dimensional barcode symbol comprising a barcode region, an empty region having an area, and a dynamic region, which is provided within the area of the empty region. The method also includes constructing a scanned pixel map containing the color values in the sensor-augmented two-dimensional barcode symbol, processing the pixels in the scanned pixel map to assign a binary color value to each pixel and to form a binarised pixel map, identifying the two-dimensional barcode symbol in the binarised pixel map, decoding the identified two-dimensional barcode symbol in the binarised pixel map to recover a symbol codeword sequence, and recovering underlying data codewords from the symbol codeword sequence. The underlying data codewords may be recovered by utilizing error correction process on the symbol codeword sequence. Additionally, the method includes processing the data codewords for identification of the dynamic region, determining an average color value of the dynamic region, and processing the average color value of the dynamic region to determine a reflectance percentage of incident light at a time of scanning.

In accordance with another exemplary aspect of the present disclosure, which may be used in combination with any one or more of the preceding aspects, processing color information includes capturing white light reflectance of pixels included in the dynamic region, and creating a colored light filter effect on reflectance data from the scanned pixels utilizing a filter (e.g., an optical or digital filter) to generate filtered colored image values of the pixels in a scanned pixel map.

In accordance with another exemplary aspect of the present disclosure, which may be used in combination with any one or more of the preceding aspects, processing color information further includes reducing the filtered colored image values in the scanned pixel map to greyscale values, determining an average greyscale value of the average color value of the barcode modules, and processing the average grey value to determine the incident light reflectance percentage at the time of scanning.

In accordance with another exemplary aspect of the present disclosure, which may be used in combination with any one or more of the preceding aspects, processing the pixels in the scanned pixel map includes classifying each pixel as one of the ternary group consisting of a black pixel, a white pixel, and a color pixel.

In accordance with another exemplary aspect of the present disclosure, which may be used in combination with any one or more of the preceding aspects, the black pixels, the white pixels, and the color pixels are used to form a ternarised (ternary-valued) pixel map, and the black and white pixels in the ternarised pixel map are used to identify the two-dimensional barcode symbol in the ternarised pixel map.

In another aspect of the present disclosure, which may be combined with any other aspect listed herein unless specified otherwise, a method of reading of a sensor-augmented two-dimensional barcode symbol includes optically scanning an image of the sensor-augmented two-dimensional barcode symbol to obtain a greyscale value for each pixel in the image. The two-dimensional barcode symbol comprising a barcode region and an empty region and a dynamic region provided within the empty region. The method also includes constructing a greyscale pixel map of the pixels in the sensor-augmented two-dimensional barcode symbol, processing the pixels in the greyscale pixel map to assign a binary color value to each pixel and to form a binarised pixel map, identifying the two-dimensional barcode symbol in the binarised pixel map, decoding the identified 2D barcode symbol in the binarised pixel map to recover a symbol codeword sequence, and recovering underlying data codewords from the symbol codeword sequence utilizing an error-correction process on the symbol codewords. Additionally, the method includes processing the data codewords for identification of the barcode modules in the dynamic region, determining an average greyscale value of the barcode modules in the dynamic region, and processing the average greyscale of the dynamic region to determine a reflectance percentage of incident light at a time of scanning.

In accordance with another exemplary aspect of the present disclosure, which may be used in combination with any one or more of the preceding aspects, an optical cutoff or bandpass filter is used when scanning the image to create the effect of monochrome or narrow-band illumination.

In accordance with another exemplary aspect of the present disclosure, which may be used in combination with any one or more of the preceding aspects, a digital cutoff or bandpass filter is used when scanning the image pixels to create the effect of monochrome or narrow-band illumination.

In accordance with another exemplary aspect of the present disclosure, which may be used in combination with any one or more of the preceding aspects, a light source is used to optically scan the image. The light source being a monochrome light source, such as a monochrome laser.

In accordance with another exemplary aspect of the present disclosure, which may be used in combination with any one or more of the preceding aspects, a barcode imager is used to optically scan the image, and wherein the barcode imager is responsive only to greyscale values.

In another aspect of the present disclosure, which may be combined with any other aspect listed herein unless specified otherwise, a method of generating a sensor-augmented two-dimensional barcode symbol includes creating a bitmap of a barcode region of a two-dimensional error-correcting barcode symbol, modifying the bitmap to create an empty region having an area within the barcode region, and generating the two-dimensional error-correcting barcode symbol with the barcode region and the empty region. The empty region comprises a dynamic region positioned within the area of the empty region. The dynamic region includes a dynamic indicator having a chemistry that is configured, responsive to the occurrence of an environmental condition, to undergo a chemical or physical state change between an initial state and an end state, causing a change in the color state of the dynamic indicator. Additionally the color state indicates exposure to the environmental condition.

In accordance with another exemplary aspect of the present disclosure, which may be used in combination with any one or more of the preceding aspects, method further includes printing the generated two-dimensional error-correcting barcode symbol.

In accordance with another exemplary aspect of the present disclosure, which may be used in combination with any one or more of the preceding aspects, the barcode region is printed after the dynamic indicator.

In accordance with another exemplary aspect of the present disclosure, which may be used in combination with any one or more of the preceding aspects, the barcode region is printed with the empty region before printing of the dynamic indicator.

In accordance with another exemplary aspect of the present disclosure, which may be used in combination with any one or more of the preceding aspects, at least a portion of the barcode region and at least a portion of the dynamic indicator are printed during the same printing step.

In another aspect of the present disclosure, which may be combined with any other aspect listed herein unless specified otherwise, a method of generating a sensor-augmented two-dimensional barcode symbol includes creating a bitmap of a two-dimensional error-correcting barcode symbol such that the barcode symbol includes a barcode region and an empty region, and generating the two-dimensional error-correcting barcode symbol with the barcode region and the empty region. The empty region is designated for a dynamic region positioned within the area of the empty region. The dynamic region comprising a dynamic indicator having a chemistry that is configured, responsive to the occurrence of an environmental condition, to undergo a chemical or physical state change between an initial state and an end state, causing a change in the color state of the dynamic indicator. Additionally, the color state indicates exposure to the environmental condition.

Additional features and advantages of the disclosed system, method, and apparatus are described in, and will be apparent from, the following Detailed Description and the Figures.

BRIEF DESCRIPTION OF THE FIGURES

FIGS. 5A-5D are each representations of a 2D barcode (e.g., a 26×26 Data Matrix) with an activated dynamic indicator showing the utahs and bit positions affected, according to an example embodiment of the present disclosure.

FIG. 9 is a first representation of a barcode reader display, according to an example embodiment of the present disclosure.

FIG. 10 is a second representation of a barcode reader display, according to an example embodiment of the present disclosure.

DETAILED DESCRIPTION OF EXAMPLE EMBODIMENTS

Figure 1A:
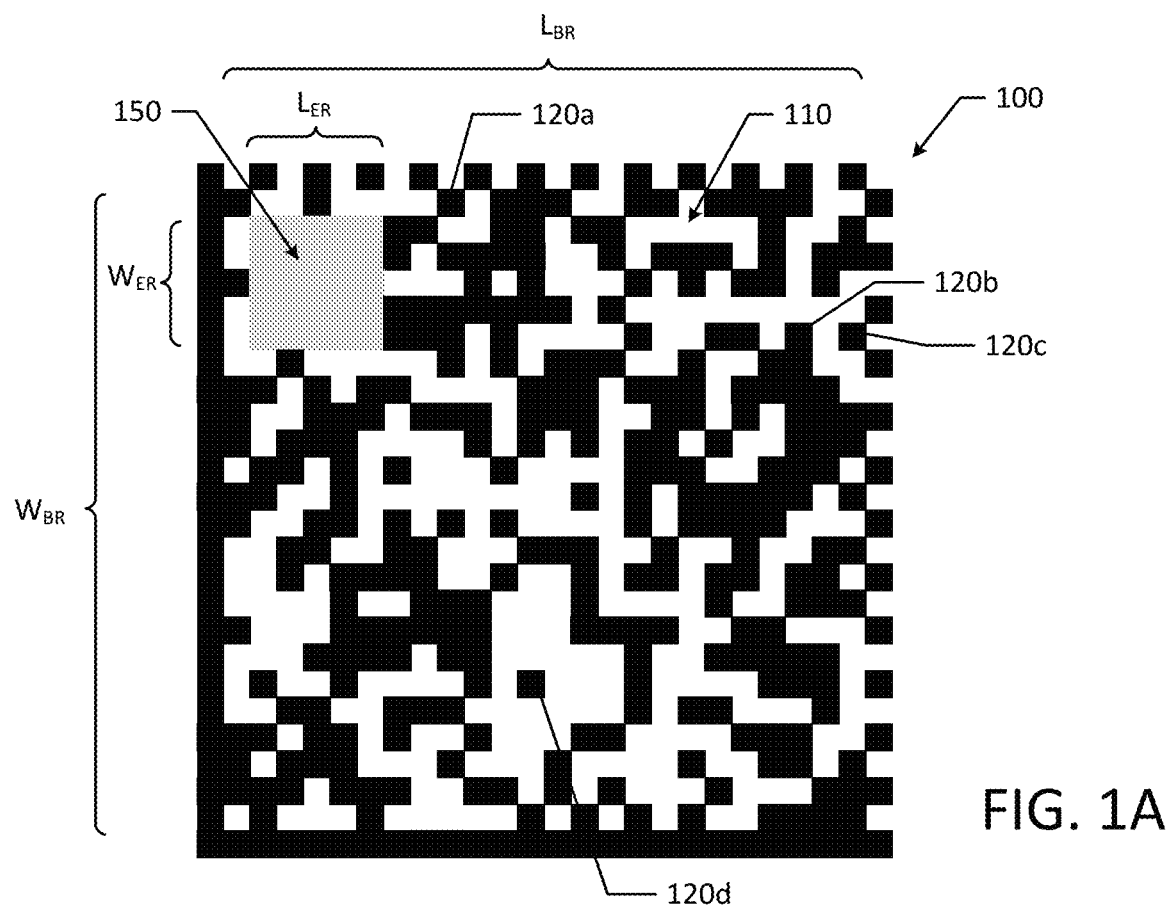
FIG. 1A is a representation of a 2D barcode (e.g., a 26×26 Data Matrix) with an activated dynamic indicator, according to an example embodiment of the present disclosure.

Prior approaches have been with one-dimensional (linear or 1D) barcodes that either become unreadable or change with stimuli. Additionally, there have been a plurality of 1D barcode patent applications that combine environmental measurements into data value of 1D barcodes. However, the techniques applicable to 1D barcodes do not appear to be applicable or advantageous to two-dimensional (2D) barcodes with dynamic environmental monitoring.

The area taken by 1D barcodes limit their practicality in applications where space is critical, e.g., unit of use applications, vials, etc. Two-dimensional barcodes with high-density encoding technologies, for example Data Matrix, may have an encoded area approximately 30 times smaller than a 1D barcode representing the same data.

Some 2D barcodes, with dynamic environmental data typically print a dynamic indicator, such as a dynamic ink (also referred to as an active ink) and the barcode modules in a two layer process where the dynamic indicator is either (i) printed first and static ink of the barcode is overprinted over the dynamic indicator or (ii) the static ink of the barcode is printed first and the dynamic indicator is applied over the static ink. For example, the dynamic indicator may be printed on a substrate first and then static barcode modules (e.g., black modules) may be printed over portions of the dynamic indicator Additionally, the static barcode modules (e.g., black modules) may be printed first and the dynamic indicator may be printed over the barcode modules such that approximately half of the dynamic indicator is overprinted on a different material (e.g., the static ink) or on a different color. In either of these scenarios, approximately half of the dynamic region is unusable because it is altered by the static barcode that is either printed under or printed over the dynamic indicator.

The portions of the dynamic region with static ink that is printed under or printed over the dynamic indicator may be unusable. For example, the static ink may change the color, reflectance or other optical properties of the dynamic indicator. Additionally, the printing process may degrade or otherwise alter the dynamic indicator chemistry making certain modules unusable.

The dynamic indicator may be a dynamic ink (also referred to as an active ink), a sensor dye, or other environmental indicator, such as a dynamic label. In an example, the dynamic ink may be a sensor dye. In another example, the dynamic ink may include a sensor dye along with other compounds or ingredients that form the dynamic ink. The dynamic indicator may be a cumulative environmental indicator, such as a HEATmarker® VVM label that contains a heat-sensitive material to monitor the cumulative exposure to temperature over time, measured by the mean kinetic temperature ("MKT").

The example 2D barcodes described herein advantageously reduces waste of both dynamic indicators and permanent or static inks, improves color accuracy, reduces the quantity of error correction codewords needed to correct the dynamic region of the 2D barcode, and allows for a variety of printing technologies and dynamic inks to be used for the dynamic 2D barcodes.

First, as compared with overprinting techniques, example 2D barcodes described herein advantageously reduces waste of both dynamic indicators and permanent or static inks. In some examples, the active ink or dynamic indicator may be the most costly component in the 2D barcode. Typically, the active ink may be damaged or made unusable by static ink that is either printed under or printed over the active ink.

As described in the example embodiments herein, the active ink is provided in an empty region, which is a region that is void of any barcode modules provided in permanent or static ink (e.g., unchanging black modules), to minimize waste of the dynamic indicator, such as a dynamic ink, that would otherwise be made unusable by the static ink printing process. For example, by providing the active ink in an empty region, more modules of active ink (e.g., up to the entire dynamic region) may be read by a barcode reader to determine the properties of the dynamic indicator. Additionally, since each module of active ink (e.g., the entire dynamic region) may be read and utilized for analysis, fewer modules of active ink may be needed for the same accuracy further reducing waste and cost.

In the scenario where the static barcode modules overlap the dynamic region, typically, 50 percent of the active ink modules may be altered or made unusable by the static ink (e.g., approximately 50 percent of the active ink is underprinted or overprinted with static ink) and thus twice the area is needed for the same colorimetric measuring accuracy. For example, with the approach described in the present disclosure, instead of overprinting the black and white static barcode on a 5 module by 5 module patch of active ink, with approximately 12 to 13 modules being unusable, a smaller dynamic region may be printed comprising of 12 modules in total. This requires 50 percent less active ink while maintaining the same accuracy as previous implementations. Applying active ink to smaller dynamic regions advantageously reduces consumption or waste of active ink for dynamic 2D barcodes. For example, by selectively printing active ink in an empty region within the barcode, smaller printing operations may be achieved without wasting ink while still ensuring the barcode provide sufficient modules and accuracy for the indicator. The dynamic region may be sized and shaped to reduce waste during the printing process.

Additionally, similarly sized dynamic regions may include more modules of the dynamic indicator (e.g., a dynamic ink that includes a dynamic indicator) that are unaffected by a subsequent static ink barcode printing process. For example, in previous techniques that overprinted part of the dynamic region with static ink, those overprinted modules are unusable for color analysis. With the dynamic indicator provided in an empty region of the barcode, each module of dynamic indicator may be used thereby providing twice the quantity of readable modules for color analysis and color averages in the same sized area. The additional dynamic indicator modules may also advantageously provide more colorimetric accuracy for the barcode reader.

The smaller dynamic region may also be shaped such that the barcode requires minimal error correction (e.g., less error correction codewords to correct the non-existent static modules in the empty region that have been replaced with the dynamic indicator), which allows smaller 2D barcodes to be used than in previous overprinting implementations. For example, overprinting or underprinting with dynamic ink in a five-module by five-module patch may require error correction from five "utahs" where each utah contains 8 modules, each of which forms one bit of either a data or error correction codeword. In contrast, barcodes with similar accuracy may be printed with dynamic indicators entirely filling the empty area, which require error correction from two "utahs". As mentioned above, applying active ink to smaller dynamic regions advantageously reduces consumption or waste of active ink for dynamic 2D barcodes while ensuring the barcode provide sufficient modules and accuracy for the indicator while also leaving additional unused error correction codewords for use elsewhere in recovering the barcode data. It should be appreciated that other dynamic region patterns and/or designs may be optimized to reduce waste, increase color accuracy, and reduce error correction needed for the 2D barcode.

Furthermore, providing an empty space within the barcode region allows different technologies to be used for printing either the underlying Data Matrix or the dynamic indicator module pattern. For example, preventing either the static ink or the dynamic ink from contacting one another, being upon each other, or being overprinted allows different kinds of dynamic indicator chemistries to be used on a previously printed Data Matrix without that dynamic indicator chemistry being known at the time the Data Matrix was printed. The dynamic indicator, such as a dynamic ink can be applied on preprinted Data Matrix barcodes, e.g., on a web of labels having such preprinted codes. This provides additional manufacturing flexibility and costs savings. With any dynamic indicator chemistry that is initially transparent, different printers may be used to print the underlying Data Matrix symbol and later print the dynamic indicator modules as a separate process, thus augmenting the Data Matrix information.

A sensor-augmented two-dimensional barcode may include a substrate with a layer provided with a barcode region and an empty region that is occupied by the dynamic region (e.g., sensor portion and barcode portion). The layer may be an overlayer that is printed on the substrate or an underlayer that is injected within or formed within the substrate. Similarly, the sensor portion may also be an overlayer that is printed on the substrate or an underlayer that is injected within or formed within the substrate.

The barcode portion and the sensor portion may be printed in either order, so that either the sensor portion or the barcode portion may be the first layer printed on the substrate, the other being printed after the first layer, but neither overlapping the other. By providing the dynamic region in an empty space, the dynamic indicator is unaffected by the printing process. The two-dimensional barcode may be attached to various products such as food products, pharmaceutical products, biologics, or any other product that may benefit from environmental, physical, or biological monitoring. For example, the bar code may be printed on or applied to a container for such a product.

Figure 1B:
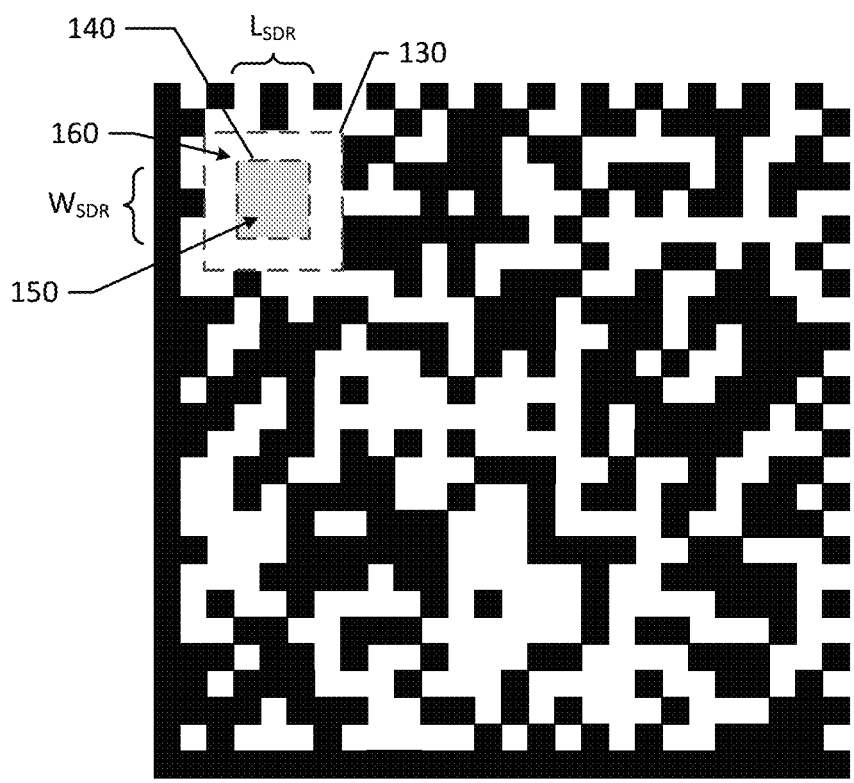
FIG. 1B is a representation of a 2D barcode (e.g., a 26×26 Data Matrix) with an activated dynamic indicator, according to an example embodiment of the present disclosure.

FIGS. 1A to 1D illustrate a representation of a two-dimensional error-correcting barcode symbol 100, which may be referred to herein generally as a 2D barcode 100, (e.g., a 26×26 Data Matrix) with an activated dynamic indicator(s) 150, according to an example embodiment of the present disclosure. The 2D barcode 100 includes a barcode region 110 that includes a plurality of modules 120a-n in a permanent or static color state (e.g., black modules). As illustrated in FIG. 1A, the barcode region 110 has a length ($L_{BR}$) and a width ($W_{BR}$). The 2D barcode 100 also includes an empty region(s) 130, which is void of modules in a permanent or static color state (e.g., black modules). The empty region 130 has a length ($L_{ER}$) and a width ($W_{ER}$). A dynamic region(s) 140 may occupy the empty region and may comprise a dynamic indicator 150 (e.g., a dynamic ink). The dynamic region 140 may entirely occupy the empty region 130 (as illustrated in FIG. 1A) or partially occupy the empty region 130 (as illustrated in FIG. 1B). The dynamic region 140 has a length ($L_{SDR}$) and a width ($W_{SDR}$).

The empty region 130 is void of modules 120 in the permanent or static color state. For example, the barcode region 110 is provided with an empty space, such as a gap or cutout that forms the empty region 130. The empty region 130 is empty with respect to the static barcode symbol, but includes a dynamic indicator, such as a dynamic ink. The barcode region 110 may be printed first with a gap or area void of modules 120 is formed to create the empty region 130. Then, a dynamic region 140 may be provided within the empty region 130 such that the 2D barcode includes the barcode region 110 with a plurality of modules 120a-n in a permanent or static color state and a dynamic region 140 with a dynamic indicator. In another example, the barcode region 110 and the dynamic region 140 may be printed at the same time such that during the printing process an empty region 130 is not created and then filled with a dynamic indicator, but instead the barcode region 110 and dynamic indicator are printed together. In this scenario, the empty region 130 identifies the portion of the 2D barcode that is void of modules 120 printed in static ink.

Each module of the Data Matrix symbol may be used to encode one bit of data. Each module in the barcode region 110 is colored either nominally colored (e.g., black) or nominally empty or clear (e.g., white). For example, nominally colored modules may be black when printed on a light substrate or may be a lighter color when printed on a dark substrate. The nominally empty or clear modules may not require any printing and may instead allow the substrate to show through. It will be appreciated that the example approach may be extended to multi-color barcodes. The module matrix is the visual manifestation of the binary bitmap matrix contained with the area of the symbol bounded by the Finder Pattern. The Finder Pattern may be an 'L' formed by connected solid lines along two edges of the symbol module matrix, with a Clock Track formed by an alternating pattern of white and black modules along the opposite edges of the symbol (See FIGS. 1A and 1B). It will be appreciated that in other bar code symbologies, other finder patterns may be employed.

In the barcode region 110, a two-dimensional error-correcting barcode symbol may be provided in a permanent or static color state, the modules may optionally be square, rectangular, or circular. The dynamic region 140 comprises a dynamic indicator that has a chemistry that is predictably responsive to a specified environmental condition, undergoing a chemical or physical state change between an initial state and an end state. The chemical or physical state change may be a continuous state change, causing a continuous color change in the color state of the dynamic indicator or a binary color state change once the measured environmental parameter crosses a predefined threshold. The barcode may optionally include one or more color calibration patches of known reflectivity to be used in auto-calibration of the barcode scanner at the reading color of interest. The color calibration batches may be positioned within the barcode (e.g., within the empty region) or adjacent to the barcode. The calibration patches may be printed as part of the dynamic region and may appear either adjacent to or at specific module positions within the sensor-augmented two-dimensional barcode.

In FIG. 1B, the activated dynamic indicator 150 is provided with a gap or border 160, such that the dynamic region 140 occupies less than the empty region 130. The gap or border 160 may provide a buffer between the printing process of the barcode region 110 and printing of the dynamic indicator. In an example of FIG. 1B, the gap 160 is a single module-wide border around the dynamic region 140.

The dynamic region 140 may include multiple dynamic indicators 150. For example, the dynamic region 140 may include two different dynamic inks that are adjacent to each other in the dynamic region 140. Each of the dynamic inks may change in response to or exposure to different environmental conditions. For example, a 2D barcode may be used on a product that can spoil based on levels of temperature or UV exposure. The barcode may include a dynamic region with two different dynamic inks adjacent to one other (e.g., one dynamic ink in the dynamic region 140 may monitor UV exposure while another dynamic ink in the dynamic region may monitor temperature exposure).

Figure 1C:
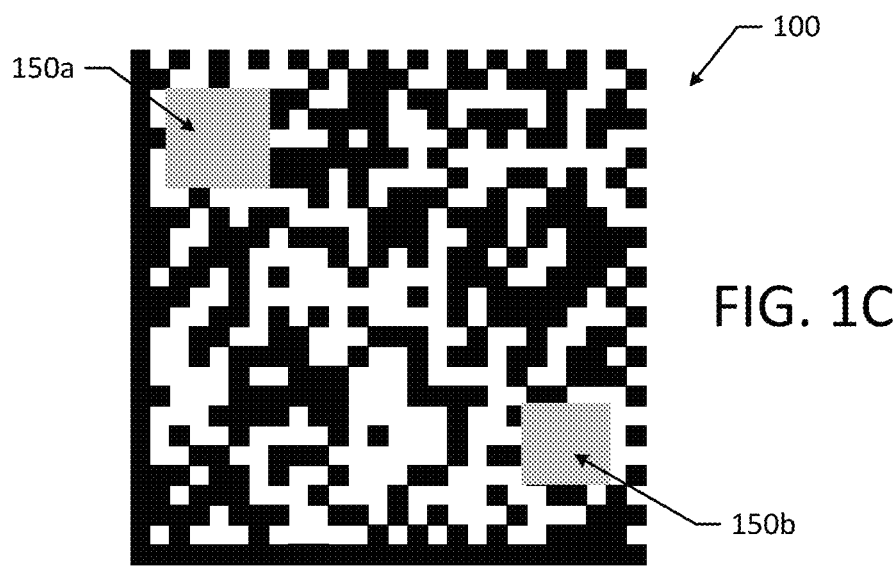
FIG. 1C is a representation of a 2D barcode (e.g., a 26×26 Data Matrix) with two activated dynamic indicators, according to an example embodiment of the present disclosure.
Figure 1D:
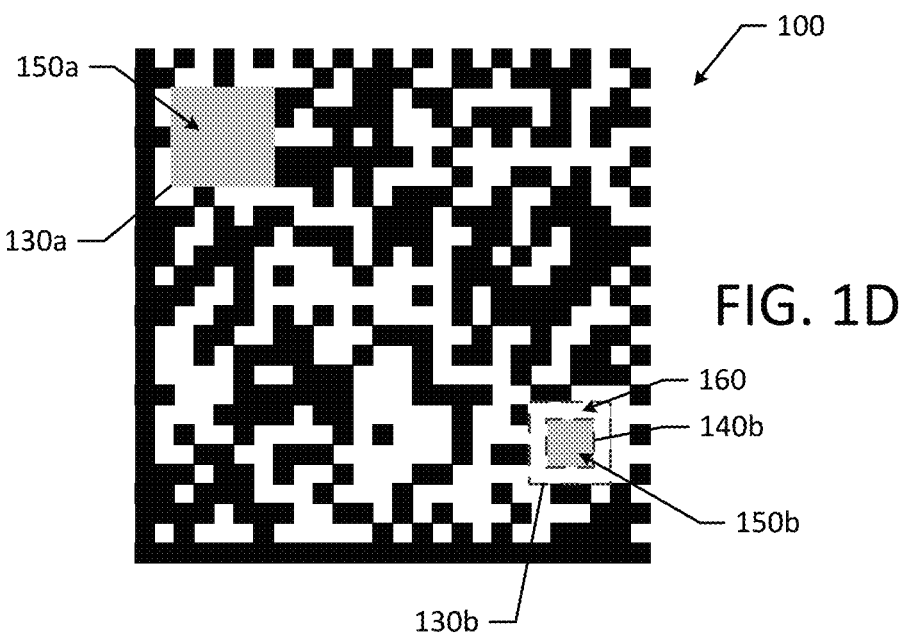
FIG. 1D is a representation of a 2D barcode (e.g., a 26×26 Data Matrix) with two activated dynamic indicators, according to an example embodiment of the present disclosure.

Additionally, as illustrated in FIGS. 1C and 1D, the barcode region 110 may include multiple empty regions (e.g., empty region 130a and empty region 130b) and multiple dynamic regions (e.g., dynamic region 140a, b with dynamic indicator 150a, b). For example, the upper left hand portion of the 2D barcode may include a first empty region 130a and first dynamic region 140a and the bottom right hand portion of the 2D barcode may include a second empty region 130b and second dynamic region 140b. Additionally, one or more of the dynamic regions 140a, b may be smaller than the empty regions 130a, b to form a gap or border 160.

As illustrated in FIGS. 1A and 1B, the empty region 130 is provided within the invariant bitmap of the 2D barcode 100 (e.g., Data Matrix, corresponding to the 5×5 (e.g., five-modules by five-modules) area of empty space. There empty region 130 may be produced by modifying the Data Matrix encoding and symbol generation software for the underlying symbol. For example, the Data Matrix's encoded bitmap may be altered to ensure that all bit positions in the empty region 130 are set to '0' or 'empty' prior to conversion to black and empty modules, or alternatively setting all modules to 'empty' in the 5×5 area (e.g., empty region 130) prior to printing the 2D barcode 100. Thus, no modules 120a-n in a permanent or static color state (e.g., black modules) are printed in the empty region 130.

The dynamic indicator 150 may occupy less than the 5×5 empty region 130, as shown in FIG. 1B. Here, the dynamic indicator 150 is shown as activated with a gap 160 between the dynamic indicator 150 and the barcode region 110. The gap 160 may prevent damage to the dynamic indicator or active ink when the barcode region 110 is printed. For example, during thermal or thermal transfer printing, heat from a thermal print head may degrade neighboring modules of dynamic indicator. For example, printing the permanent or static color state modules 120a-n in a static or permanent ink near the dynamic indicator may affect the dynamic indicator chemistry (e.g., printing process may involve the application of light or heat that may affect the dynamic indicator).

By providing the dynamic region in the empty region, the dynamic indicator is unaffected by the printing process. Even if the dynamic indicator is printed after the barcode region 110, the static or permanent ink may affect the chemistry of the substrate near the printing process and thus may affect the dynamic indicator in that region. As mentioned above, providing a gap or border 160 may negate or reduce the effects of the heat or light applied by the printing process, which may degrade the dynamic indicator. The gap or border 160 may provide a buffer region such that a predetermined spacing exists between the dynamic indicator and the static ink to ensure that the subsequent print action does not degrade the dynamic indicator chemistry.

Another advantage to providing a gap 160 is to make the dynamic region 140 more visually distinguishable to a user. For example, by providing a gap 160, when the dynamic indicator 150 is activated, the dynamic indicator 150 has adequate contrast compared to the empty or colorless gap 160. In another example, the gap or border 160 may be a solid color (e.g., black) similar to the color of the static ink to provide additional contrast between the dynamic indicator 150 and the barcode region 110. Additionally, a black border may be used around the gap 160 and the barcode region 110 and/or the dynamic indicator 150 to provide contrast between each region (e.g., black, empty space or white, black, and dynamic indicator color).

The empty region 130 of the barcode 100 may be aligned with the dynamic indicator 150 before printing to ensure that the dynamic indicator 150 is properly positioned within the empty region 130 of the barcode 100 (e.g., positioned within the invariant area). For example, the dynamic indicator 150 may be positioned within the invariant area of the 2D barcode 100 such that the upper left corner ("ULC") of the Data Matrix is aligned with the ULC of the dynamic indicator 150. It should be appreciated that the dynamic indicator 150 can be positioned in other regions or positions within the 2D barcode 100. Additionally, the dynamic indicator 150 may be positioned outside but near the 2D barcode 100 such that it is still associated with the barcode during scanning.

The sensor-augmented two-dimensional barcode may include a substrate with a layer provided with a barcode region 110 and an empty region 130 that is occupied by the dynamic region 140 (e.g., sensor portion and barcode portion). The layer may be an overlayer that is printed on the substrate or an underlayer that is injected within or formed within the substrate. Similarly, the sensor portion may also be an overlayer that is printed on the substrate or an underlayer that is injected within or formed within the substrate.

The barcode portion and the sensor portion may be printed in either order, so that either the sensor portion or the barcode portion may be the first layer printed on the substrate, the other being printed after the first layer, but neither overlapping the other.

The barcode region 110, the dynamic region 140 or a combination of the barcode region 110 and the dynamic region 140 may be optically readable by a device and readable by a human. In another example, one of the barcode region 110 and the dynamic region 140 may be readable by a device and unreadable to a human. Additionally, both the barcode region 110 and dynamic region 140 may not be human readable (e.g., the dynamic indicator is in the UV spectrum and unreadable by a human). Specifically, the 2D barcode may be entirely human visible, only the dynamic indicator may be human visible, or none of the 2D barcode may be human visible.

Figure 2A:
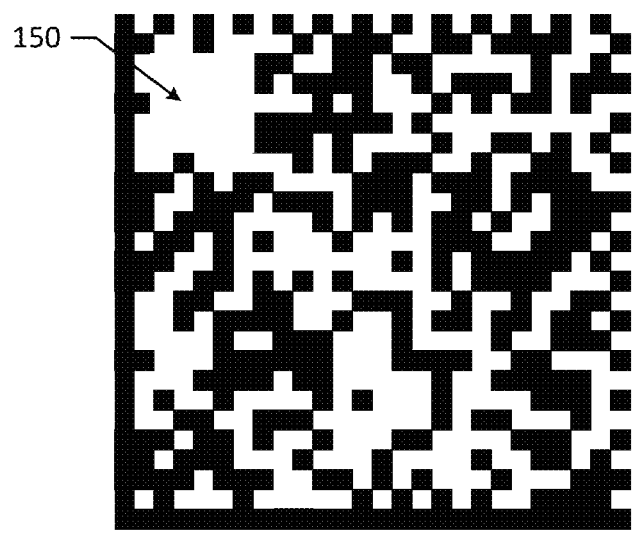
FIG. 2A is a block diagram of a 26×26 Data Matrix with a dynamic indicator in the invariant space in an initial state according to an example embodiment of the present disclosure.
Figure 2B:
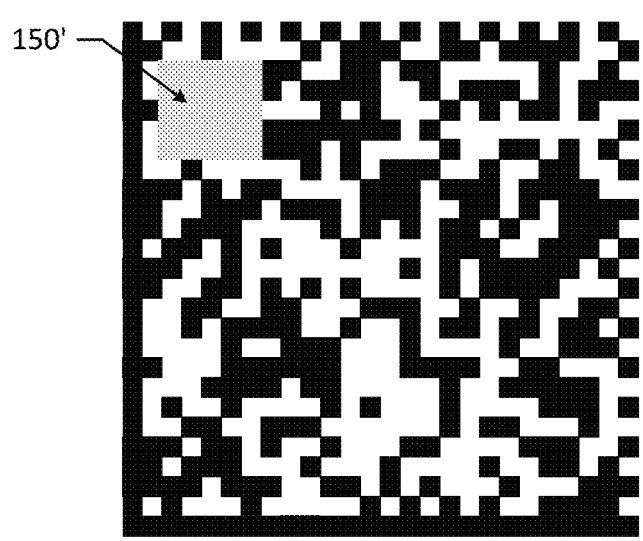
FIG. 2B is a block diagram of a 26×26 Data Matrix with a dynamic indicator in the invariant space in a first intermediate state between the initial state and end state, according to an example embodiment of the present disclosure.
Figure 2C:
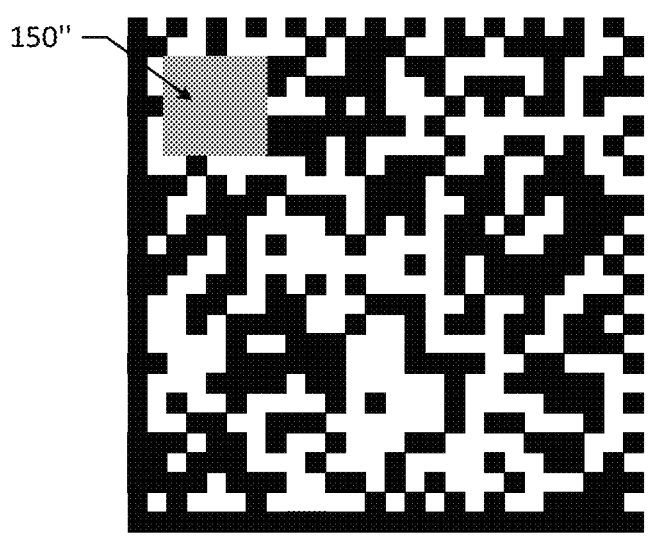
FIG. 2C is a block diagram of a 26×26 Data Matrix with a dynamic indicator in the invariant space in an end state, according to an example embodiment of the present disclosure.

FIGS. 2A-2C illustrate example block diagrams of a 2D barcode 200 (e.g., 26×26 Data Matrix) with a dynamic indicator 150 positioned to fill the empty region 130 and transitioning between an initial state and an end state. For example, the dynamic indicator 150 illustrated in FIG. 2A in an initial state (e.g., dynamic indicator 150), which transitions to an intermediate state in FIG. 2B (e.g., dynamic indicator 150') and later transitions to an end state in FIG. 2C (e.g., dynamic indicator 150"). The dynamic indicator 150 may change color from being clear in the intial state, to a plurality of intermediate color states where the dynamic indicator 150 changes to a faint color and becomes less and less opaque until it reaches a solid color at the end state. In FIGS. 2A-2C, the dynamic indicator 150 is illustrated as square shape that occupies the entire empty region 130. However, as discussed above, the dynamic indicator 150 may have different shapes and sizes and may occupy a portion of the empty region 130. In an example, modules within the dynamic region 140 of the barcode may continuously (as contrasted with step-wise) change color state in response to environmental conditions.

Figure 8:
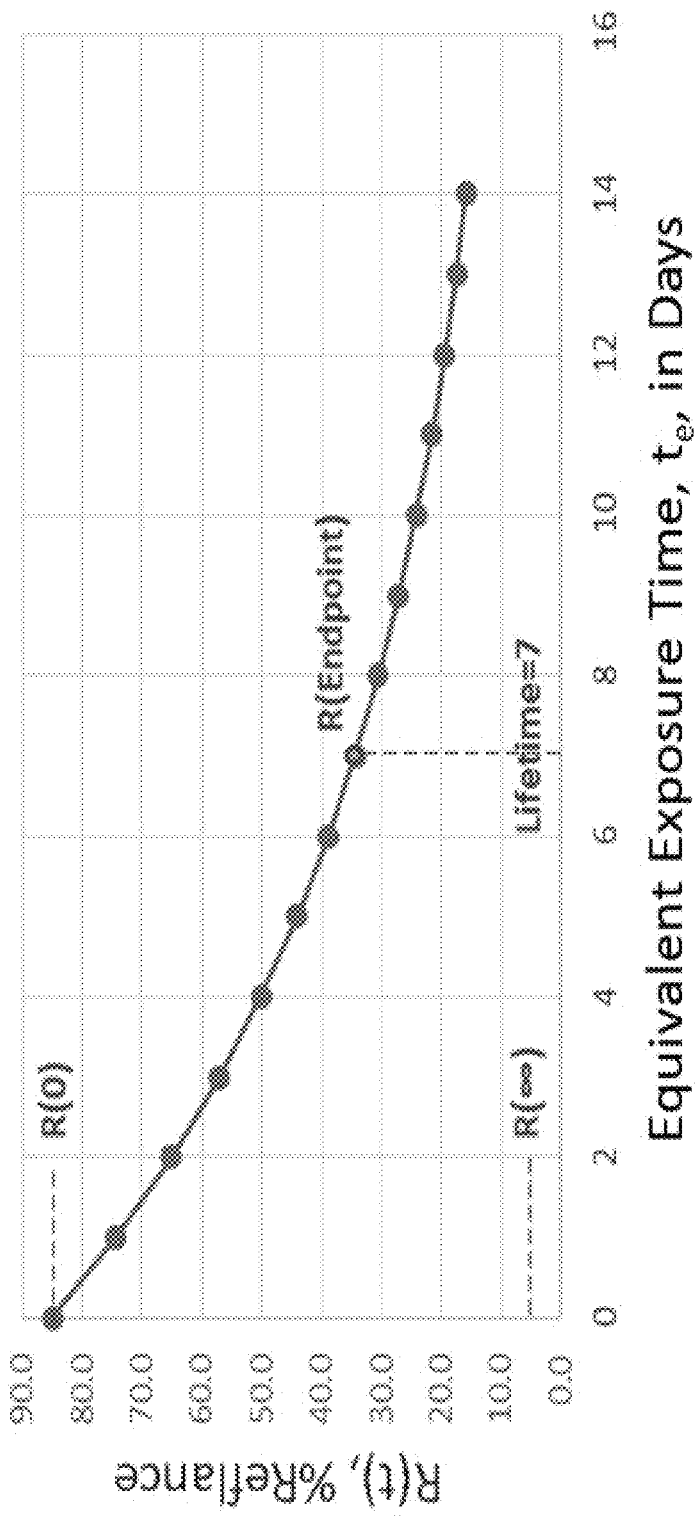
FIG. 8 is a graph of Reflectance R(t) vs. Equivalent Exposure time (t) of a dynamic indicator, according to an example embodiment of the present disclosure.

The barcode in FIG. 2A may represent an intial state (e.g., dynamic indicator 150) where an associate product has 100% remaining life. For example, the 2D barcode 100 may be a barcode on a medical product (e.g., inactivated Polio vaccine) that may be scanned to reveal product lifetime data, as illustrated in FIG. 9, such as a Monitor Category: VVM7 ("vaccine vial monitor" with a nominal L=7 day usage life), 80 percent life remaining, expiration date (e.g., calculated from the estimated remaining life or based on some other criteria), and product authenticity. Additionally, the barcode data may include Application Indicators AI (01) for a GTIN, AI (10) batch number, and AI (21) serial number that are displayed by the 2D barcode reader. The static barcode data in the barcode region 110 may contain sensor information, for example using AI (8009), such that the barcode reader is automatically provided with the appropriate equation parameters and inputs to calculate the remaining product life according to the current color state of the dynamic indicator 150. After reflectance data is obtained from the image sensor, the appropriate equation parameters can be used to determine equivalent exposure time ($t_e$) at the reference temperature, as illustrated in FIG. 8. Subtracting ($t_e$) from the lifetime gives the remaining product life at the reference temperature.

The 2D barcode may include one or more Application Identifiers ("AI") such as AI (01) for a GTIN-14 of the product, an AI (10) for lot number, an AI (17) for product expiration of the lot, AI (21) for a serial number of the time-temperature label, and an AI that indicates the barcode includes a temperature exposure indicator. Additionally, using an AI (90), AI (8009) or another part of the Data Matrix barcode data may identify or form the size and/or location of the dynamic indicator, such as the temperature exposure indicator. An additional AI or other method of data encodation may be used in the 2D barcode having parameters that describe the Arrhenius kinetics of the chemical reaction equation of the color response to the sensor's specific environmental factor. In another example, the same AI may specify both the size and location of the dynamic indicator along with the product life equation parameters. After the Data Matrix barcode and the dynamic indicator are printed, the sensor-enabled barcoded labeled product is distributed through its normal supply chain to an end user.

The dynamic indicator 150 may transition between an initial state and an end state. FIG. 2B represents the 2D barcode 100 (and dynamic indicator 150') in an intermediate state, after an initial state. For example, the dynamic indicator 150' may change from clear or colorless in the intial state to a faint color in the intermediate state. To ensure accuracy of product life calculations, the 2D barcode 100 may be encoded such that a threshold value of opacity or reflectance in the dynamic indicator 150 is identified as the end of the product life. For example, the 2D barcode 100 may be encoded such that the barcode reader determines that the dynamic indicator reaching an end state reflectance R(endpoint) is expired, which may allow a reader to determine how long a product has been expired.

For example, if the product expiration was set at the final reflectance end state R(∞) of the dynamic indicator, then the rate of change of reflectance may be too slow to practically determine when the dye patch 150 had reached the end state. However, if the expiration is set at an intermediate state, say when the reflectance is R(endpoint), as shown in FIG. 8, before the end state R(∞), the 2D barcode may be configured to also provide information about cummulative environmental exposure after expiration.

As illustrated in FIG. 2C, the dynamic indicator 150" is in the end state. FIG. 2C may also represent the sensor dye patch 150" in a second intermediary state e.g., the expired state R(Endpoint), before the end state R(∞). The expired state R(endpoint), may be used as the threshold value. As illustrated in FIG. 10, the product has exceeded its suitable life and the barcode reader may display "Test Failed". For example, due excessive exposure to time, temperature, or both time and temperature, the product may have no remaining life. Regardless of the color state of the dynamic indicator 150, the static 2D barcode data in the barcode region 110 carries the same GTIN, batch number, serial number, etc. and carries the parameters necessary to implement the R(t) equation shown in graphical form in FIG. 8.

After reflectance data is obtained from the image sensor, the appropriate equation parameters can be used to determine equivalent exposure time ($t_e$) at the reference temperature, as illustrated in FIG. 8. Subtracting ($t_e$) from the lifetime gives the remaining product life at the reference temperature. If the remaining life is positive, then the percentage of really remaining life may be calculated by dividing $t_e$ by L, and the barcode reader may display "Tests Passed" as in FIG. 9, along with the vaccine's available remaining life.

Figure 3:
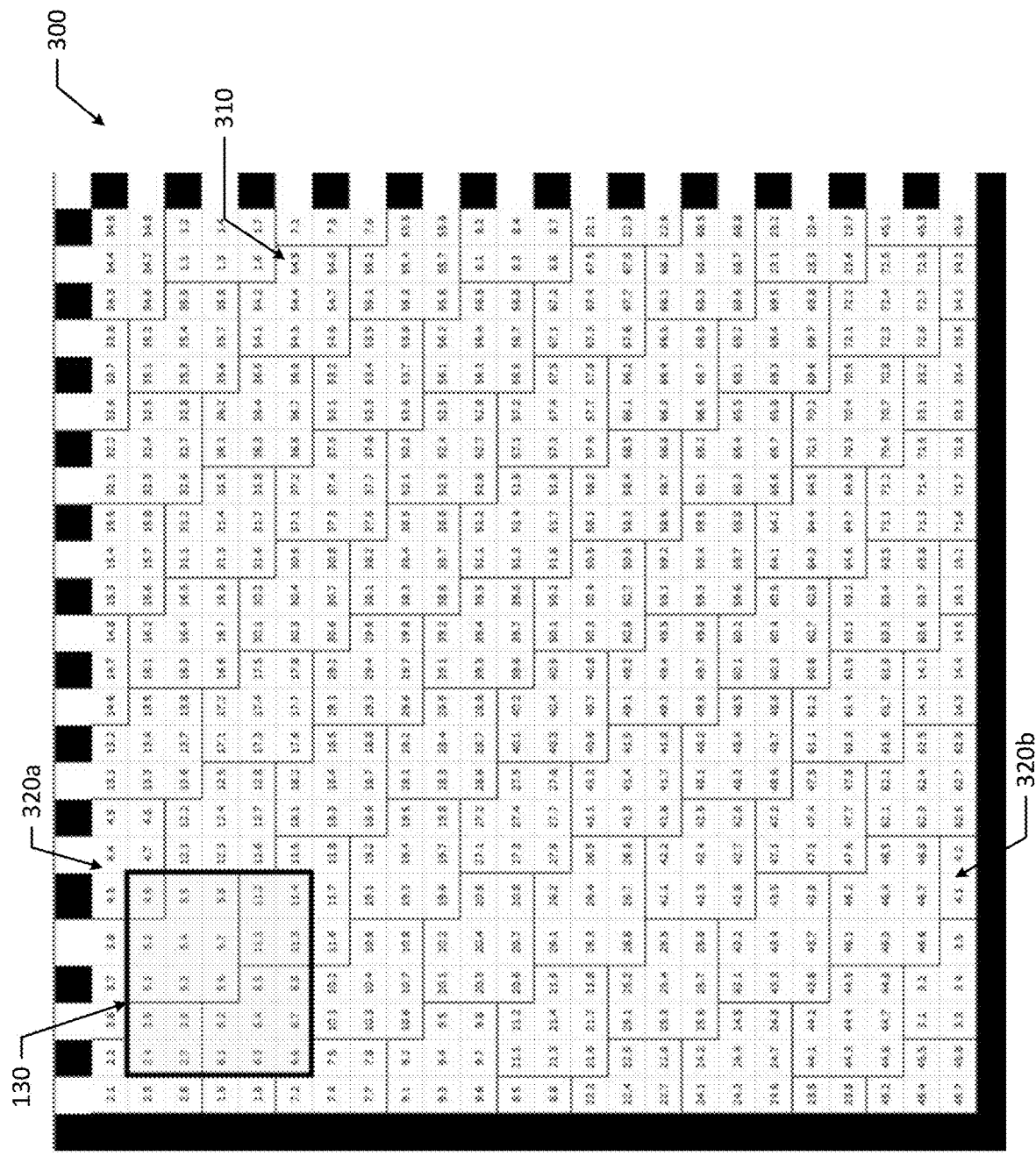
FIG. 3 is an illustration of codeword and utah placement and a segment of a 24×24 bitmap matrix within a 26×26 Data matrix symbol, according to an example embodiment of the present disclosure.
Figure 4:
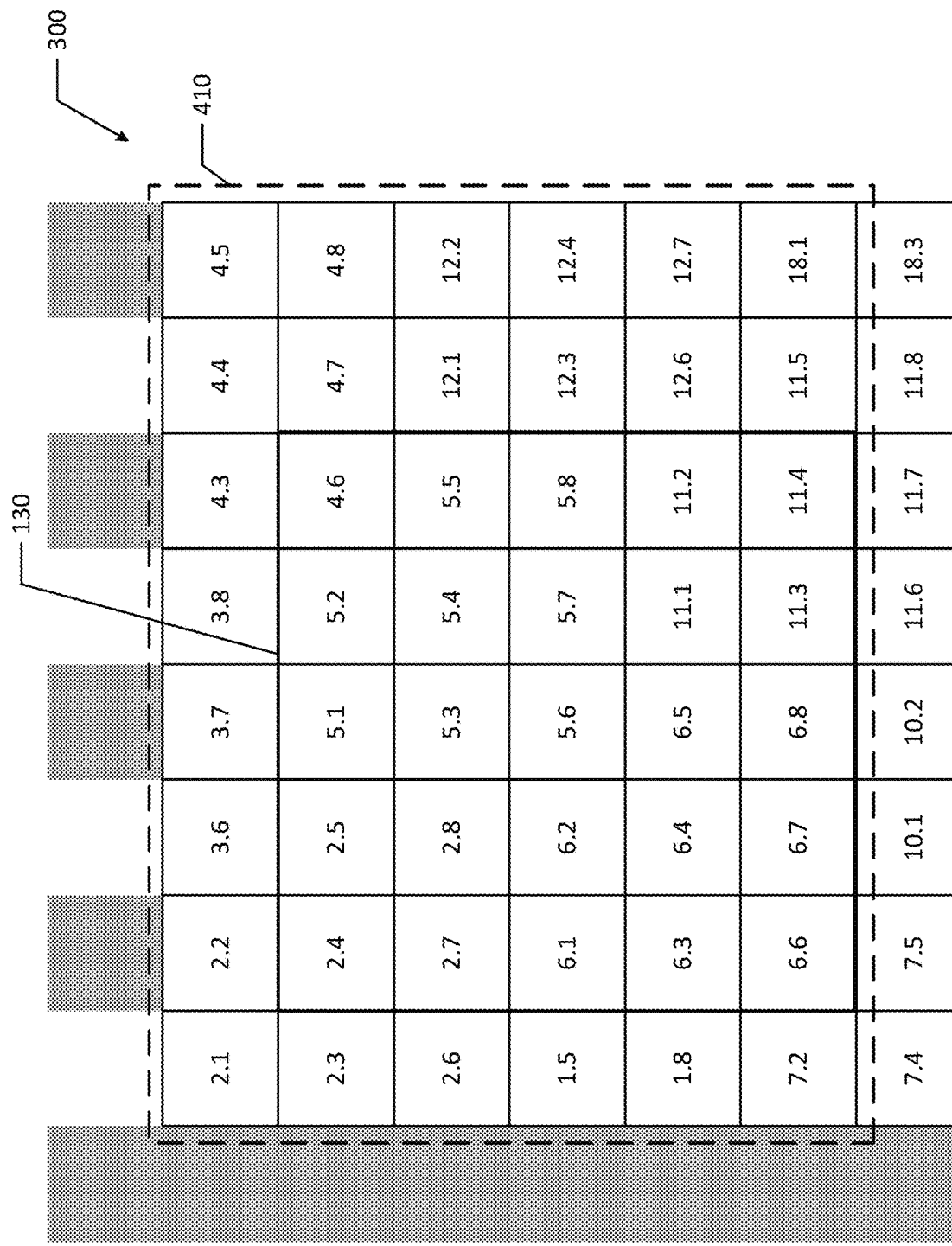
FIG. 4 is a block diagram of invariant utah placement in all practical sizes of Data Matrix symbols, according to an example embodiment of the present disclosure.

The detailed structure of a 24×24 module matrix of the 26×26 Data Matrix or 2D barcode 100 (as illustrated in FIGS. 1A and 1B) is shown as the bitmap matrix 300 in FIG. 3 with empty region 130. FIG. 4 illustrates a typical enlarged invariant bitmap 410 and empty region 130 of the bitmap matrix 300 of FIG. 3. A 26×26 Data Matrix contains 72 codewords, each formed of eight modules corresponding to the eight bits of the codeword, referred to as a "utah." The 24×24 bitmap matrix shows the layout of all the 72 codewords in a 26×26 Data Matrix.

A "utah" is an arrangement of 8 modules to encode one codeword. It may be arranged either as a single connected group with a pattern frequently in the shape of the State of Utah in Data Matrix, or formed as two subgroups of connected modules split across two or more utah patterns. In FIG. 3, the contiguous utah 310 encoding codeword "54" shows the typical arrangement of bits within a contiguous utah. Conversely, the utah for codeword "4" consists of two smaller subgroups: Subgroup 320a at the top of the bitmap matrix 300 encoding bits 4.3 through 4.8, and subgroup 320b at the bottom of the bitmap matrix encoding bits 4.1 and 4.2.

The general layout of codeword utah placement within a 26×26 Data Matrix bitmap matrix 300 is shown in FIG. 3. The placement of (i) all bits of utah "2", (ii) utah "3" bits 3.6-3.8, (iii) utah "4" bits 4.3-4.8, and (iv) all bits of utahs "5" and "6" may be placed in identical positions relative to the upper left-hand corner ("ULC") of the Data Matrix symbol. In accordance with ISO/IEC 16022 standard Annex F.3, all square Data Matrix symbols up to size 26×26 and all rectangular Data Matrix symbols, these bit positions are invariant in their placement relative to the ULC of each Data Matrix symbol. These bit positions define an "invariant bitmap" for Data Matrix symbols. It will be appreciated that other barcode standards may have different invariant bitmaps.

It should be appreciated that a 26×26 Data Matrix is provided for illustration purposes only. The systems and methods described herein may apply to other Data Matrix sizes and other styles of 2D barcodes. For example, the Data Matrix may be 10×10, 12×12, 14×14, 40×40, up to 144×144 and may have 8, 12, 18,162 or 2178 codewords respectively. Additionally, it should be appreciated that the example embodiments disclosed herein may translate to various 2D barcodes including an Aztec Code, Code 1, CrontoSign, CyberCode, DataGlyphs, Data Matrix, Datastrip code, EZcode, High Capacity Color Barcode, InterCode, MaxiCode, MMCC, NexCode, PDF417, Qode, QR code, ShotCode, SPARQCode, and the like.

Dynamic Indicator Geometry

Figures 5A, 5B:
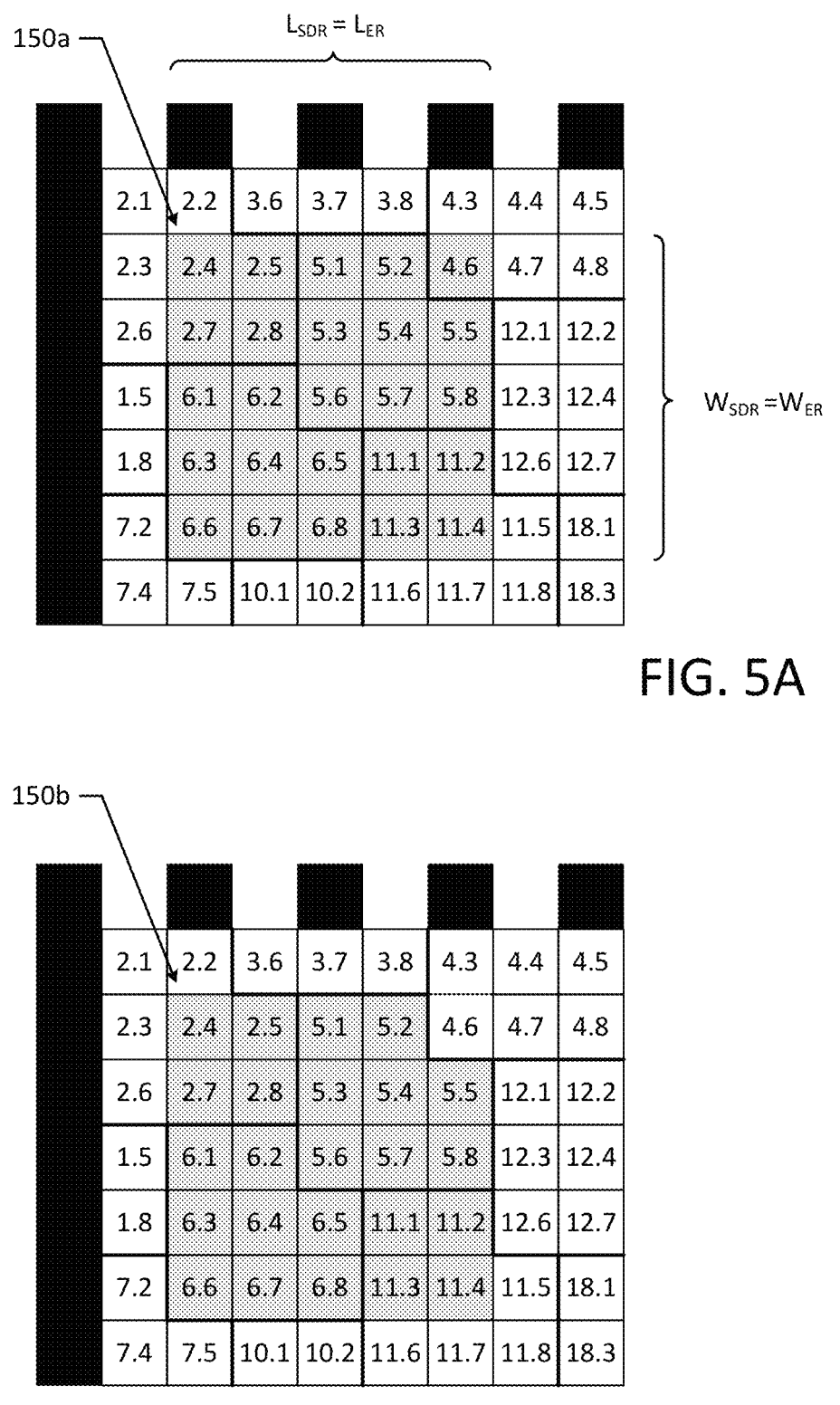

FIG. 5A illustrates an example dynamic indicator 150a that occupies the entire empty region 130. For example, the dynamic region 140 includes a dynamic indicator (e.g., a dynamic indicator 150) that occupies each of the bits shaded in FIG. 5A. For example, the empty region 130 and dynamic indicator 150 occupy 25 modules in the 5×5 area including bits 2.4, 2.5, 2.7 and 2.8 from utah "2"; bit 4.6 from utah "4"; bits 5.1, to 5.8 from utah "5"; bits 6.1 to 6.8 from utah "6"; and bits 11.1 to 11.4 from utah "11". The dynamic indicator 150a illustrated in FIG. 5A provides 25 modules or sensor information, which is approximately twice the amount of usable modules than with overprinted or underprinted techniques. In this example dynamic region configuration, all or part of five different utahs (e.g., utahs "2, 4, 5, 6 and 11") are included in the dynamic region 140 and thus five error correction codewords are needed to correct the bits within these regions to read the 2D barcode.

FIG. 5B illustrates another example dynamic indicator 150b that occupies an entire empty region 130. In this illustrated example, the dynamic region is shaped to eliminate the use of bit 4.6 such that it occupies 24 modules, but instead only requires four error correcting codewords. In this example embodiment, the barcode retains 96 percent (e.g., 24/25) of its sensor accuracy while achieving a 20 percent reduction in codewords for error correction (e.g., 4/5).

Figures 5C, 5D:
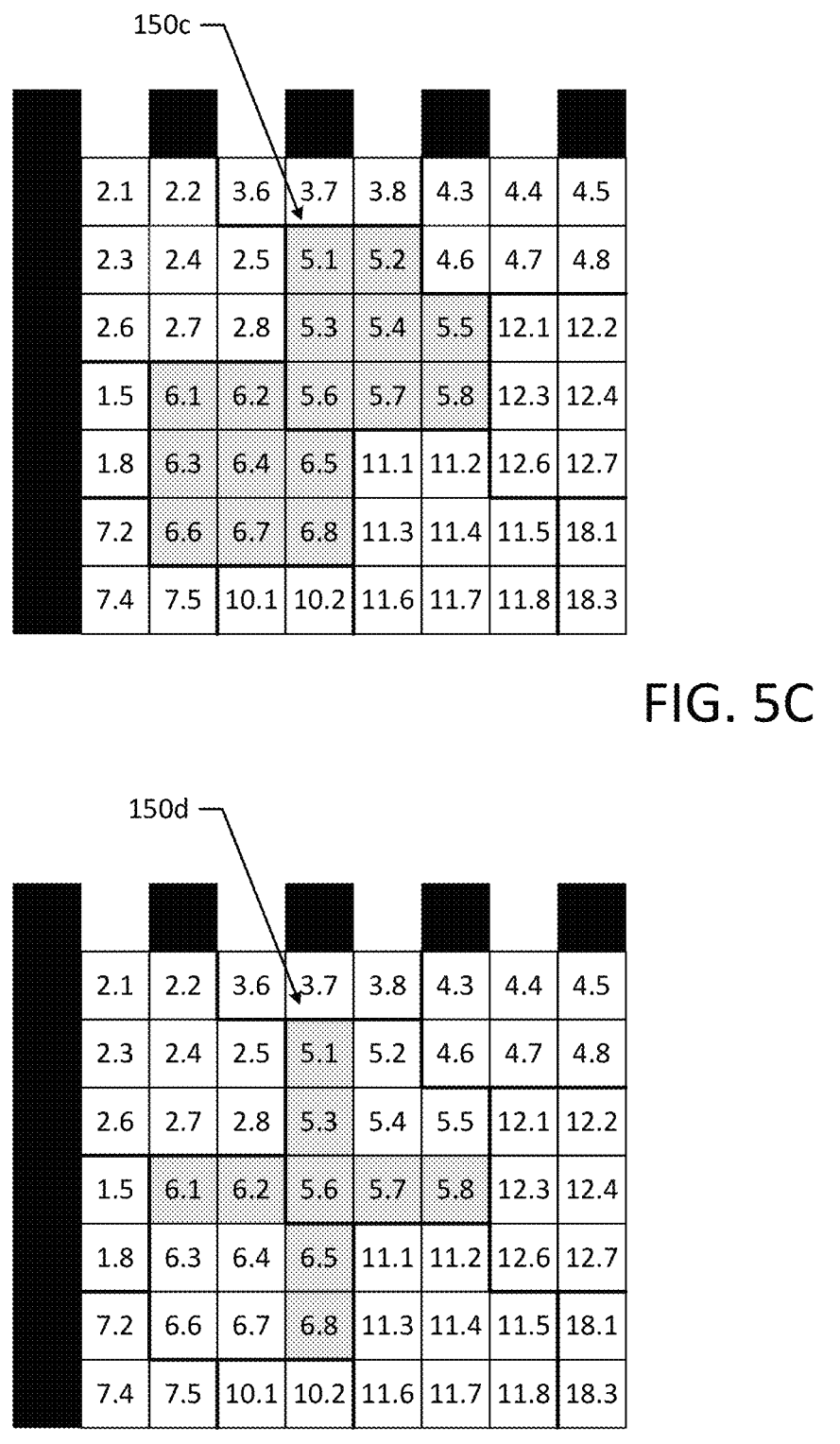

FIG. 5C illustrates yet another example dynamic indicator 150c that occupies an entire empty region 130. In this illustrated example, the dynamic region is shaped to eliminate the use of bits in utah "4", utah "2" and utah "11" such that it occupies 16 modules, but instead only requires two error correcting codewords. In this example embodiment, the barcode retains 64 percent (e.g., 16/25) of its sensor accuracy while achieving a 60 percent reduction in codewords for error correction (e.g., 2/5).

FIG. 5D illustrates another example dynamic indicator 150d. In an example, the dynamic indicator 150c may occupy the entire empty region 130. Conversely, dynamic indicator 150d may occupy a portion of the empty region 130 (e.g., empty region may include a 5×5 square of modules from bits 2.4 to 6.6 and across to bits 4.6 and 11.4). By positioning the dynamic indicator 150d within a portion of the empty region 130 and in the shape of a "+" sign or a cross pattern, the dynamic region 130 may be adapted to be visually distinguishable and perceivable by a user. For example, the user may quickly recognize the shape of the dynamic region 140 to determine a status of the two-dimensional barcode and thus the product the barcode is attached to. If the senor dye changes to a dark red color at and end state, a red cross pattern or "+" sign may indicate that the product is expired, which the user can quickly see without having to scan the item.

Figure 6A:
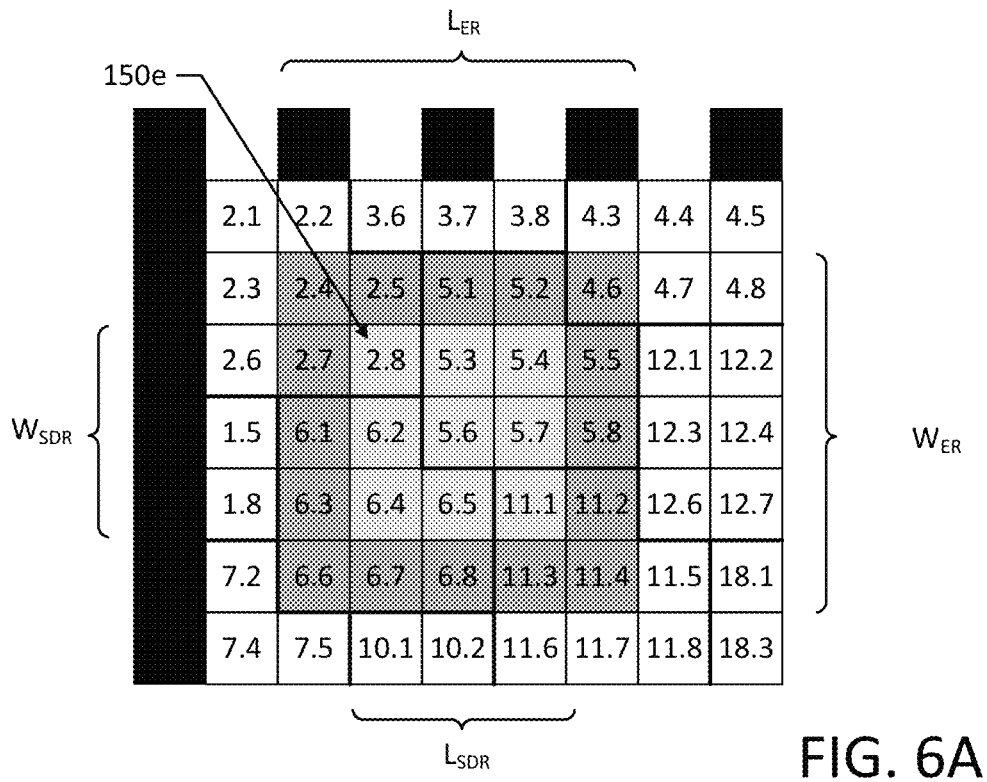
FIGS. 6A and 6B are representations of a 2D barcode (e.g., a 26×26 Data Matrix) with an activated dynamic indicator, according to an example embodiment of the present disclosure.

As mentioned above, previous overprinting techniques typically make half of the dynamic region unusable either due to static ink being printed over and covering the dynamic indicator (e.g., barcode reader detects this module as a black module) or the dynamic indicator being printed over the static ink such that it affects the appearance of the activated dynamic indicator (e.g., barcode reader detects this module as a black module or a module with a different color than dynamic indicator printed directly on a substrate). With the previous techniques, a 25 module dynamic region will typically yield on average 12.5 usable modules of dynamic indicator, which is less than each of the previous embodiments described in FIGS. 5A-5C FIGS. 6A and 6B illustrate additional example dynamic indicators 150e and 150f that are provided with a gap or border 160, such that the dynamic region 140 occupies less than the empty region 130. As illustrated in FIG. 6A, the entire empty region may include 25 modules in the 5×5 area with corner bits 2.4, 4.6, 6.6 and 11.4. The dynamic indicator 150e may include 9 modules in the 3×3 area with corner bits 2.8, 5.4, 6.4 and 11.1. In this example, the gap or border 160 has the width of one module. As discussed above, the gap 160 may improve the visibility of the dynamic indicator 150e and may also ensure that the printing process or application process of the static ink and the dynamic ink do not interfere with each other.

Figure 6B:
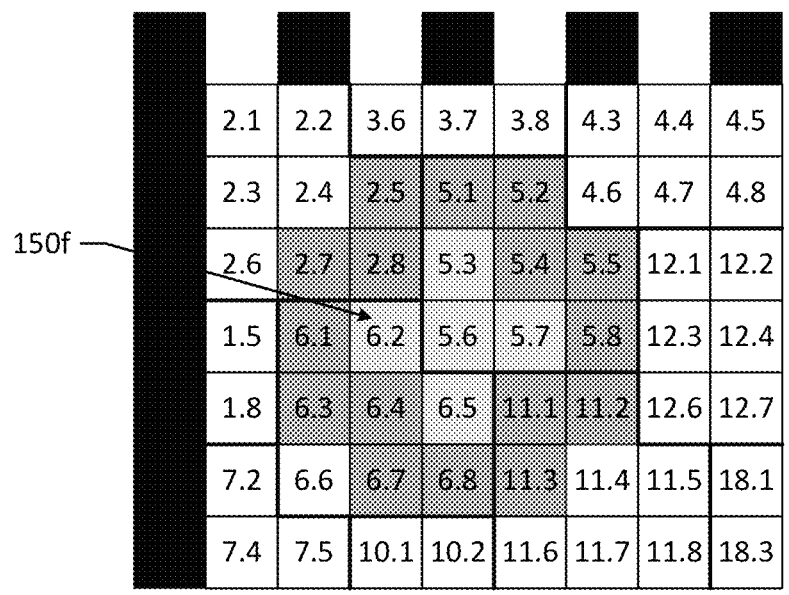

As illustrated in FIG. 6B, the empty region 130 occupies the darker shaded modules and the dynamic region 140 occupies the lighter shaded modules including bits 5.3, 5.6, 5.7, 6.2 and 6.5 in a cross or "+" sign pattern. Other types of sensor digital information may be encoded in the dynamic indicator module pattern. This includes visual patterns and images of any type, such as ISO or ANSI or ISO warning signs and symbols, or any other type of designed graphic.

As illustrated in FIGS. 1A and 1B and again illustrated in FIGS. 5A and 6A, the barcode region 110, the empty region 130 and the dynamic region 150 may each have a respective size or area. For example, the areas may be defined by lengths and widths. The barcode region 110 may have a length ($L_{BR}$) and a width ($W_{BR}$), the empty region 130 may have a length ($L_{ER}$) and a width ($W_{ER}$), and the dynamic region 140 may have a length ($L_{SDR}$) and a width ($W_{SDR}$). A two-dimensional error-correcting barcode symbol 100 may include a dynamic region 140 with an area ranging between four square modules (e.g., two-by-two) and 36 square modules (e.g., six-by-six) for 24×24 or 26×26 data matrix 2D barcodes, which have areas of 576 square modules and 676 square modules respectively. For example, a 26×26 data matrix 2D barcode may be approximately 10 mm by 10 mm (0.394 inches by 0.394 inches), which has a module length and width of approximately 0.385 mm and a dynamic region 140 with an area ranging between approximately 0.593 mm² and 5.336 mm². In another example, the 26×26 data matrix may be approximately 5 mm by 5 mm (0.197 inches by 0.197 inches), resulting a module with a length and width of approximately 0.192 mm. The barcode sizes may vary depending on the application (e.g., product or scanning equipment). For example, barcodes placed on vaccine vials may be small while barcodes placed on packages or shipping labels may be 30 mm by 30 mm or larger.

The 2D barcode 100 may be optimized such that the area of the dynamic region 140 is the minimum area for accommodating a specified dynamic indicator, such as a vaccine vial monitor ("VVM"). Additionally, the area of the barcode region 110 may be specified such that it is the minimum area to provide error correction for a preselected dynamic region 140. For example, as the dynamic region 140 increases in size, more modules or bits are intentionally damaged and thus will require error error correction. As the number or error correction codewords increases, the size of the barcode region 110 increases to accommodate those codewords. As mentioned above, the barcode symbol 100 may include a dynamic region 140 with an area ranging between four square modules (e.g., two-by-two) and 36 square modules (e.g., six-by-six), where dynamic regions 140 larger than 36 square modules may be less preferable due to the error correction overhead.

Dynamic Ink

In an example embodiment, the dynamic ink or dynamic indicator may be sensitive to an environmental factor such as temperature, time, time and temperature, freezing, radiation, toxic chemicals, or a combination of such factors, or the like. In an example embodiment, the ink may be a thermochromic ink, such as a water-based irreversible thermochromic ink designed to change permanently from white to black at 40° C. Additionally, the thermochromic ink may be reversible. For example, the reversible thermochromic ink may be a liquid crystal ink or a leuco dye ink (examples include QCR Solutions Reversible Thermochromic Inks and H. W. Sands Corporation inks). The ink may also be a photochromic ink (e.g., changes based on exposure to UV light). The ink may be an ink sensitive to time and temperature (an example includes the OnVu indicator).

The dynamic ink may change from a darker color to a lighter color, a lighter color to a darker color, may change levels of transparency or opacity, and/or may change levels of reflectivity or absorptivity, or may change any other suitable characteristic allowing the barcode to be readable in one or more states by a reader. Additionally, the dynamic ink may continuously change between a range of an initial color state to an end color state.

For example, a dynamic ink may change from a lighter color to a dark blue, which may be alternatively transformed by a reader to values on continuous "greyscale". The greyscale (which is not necessary truly grey but is a continuous tone of some hue) is determined reducing the R, G and B values of each pixel to a single greyscale value by a formula of form:

Greyscale value=$(aR+bG+cB)/K$

Where {a, b, c} represent the relative contribution of each sRGB color in the pixel, and K is scaling factor. Additionally, a dynamic ink or dynamic indicator may continuously change from a white or clear color to a dark red or blue (e.g., changing from white, to a faint red, become less and less opaque until it reaches a solid red color at the end color state). Moreover, any suitable combination of colors may be used for the states of one or more dynamic inks.

Error Correction

To define terminology, the printed Data Matrix symbol prior to augmentation with sensor modules is referred to as the "underlying Data Matrix symbol"; its codeword sequence as the "underlying symbol codeword sequence" encoding "underlying data codewords and their RSEC error correction codewords". It will be appreciated that other symbologies have their own underlying symbols, underlying codeword sequences, underlying data codewords and error correction codewords, depending on the particular type of error correction employed.

Some examples described herein employ Data Matrix, although it will be appreciated that similar approaches may be employed with other two dimensional bar codes schemes by varying the approach to conform with the applicable 2D barcode standard. An ECC 200 Data Matrix symbology utilizes Reed-Solomon error correction to recover the encoded data from symbols which have suffered a limited amount of accidental damage or deliberate alternation.

Data is encoded in a Data Matrix as a sequence of 8-bit codewords, or symbol character values. Codewords may either contain data or Reed-Solomon error correction (RSEC) check character values. It will be appreciated that the general approach described herein may use other codeword sizes, other data layouts, and other forms of error correcting codes, and that this common Data Matrix is only described as an example.

For a complete and normative description of the method of error correction employed in DataMatrix see the current version of International Standard ISO/IEC 16022, "Information technology—Automatic identification and data capture techniques—Data Matrix bar code symbology specification."

Many types of error correcting codes may be used to encode sensor digital information. Typically encoded is a dynamic indicator bit pattern of binary-encoded sensor data. Useful error correcting codes include Hamming Codes, Bose-Chaudhuri-Hocquenghem Codes, Golay Codes, Simplex Codes, Reed-Muller Codes, Fire Codes, Convolutional Codes, and Reed-Solomon Codes.

Each data codeword normally requires two RSEC codewords to recover the underlying data. As an example, a 16×16 square Data Matrix which has a capacity for 12 data codewords (12 data utahs) and has 12 RSEC codewords (12 RSEC utahs). Thus if activated sensor modules change 4 data utahs in that 16×16 symbol, then eight RSEC codewords are utilized to recover the data in those for altered utahs. This leaves 4 additional RSEC codewords available for correction of any other symbol damage.

However, knowledge that codewords have been deliberately damaged may be used to improve the efficiency of the Reed-Solomon error correction process in the symbol codeword sequence recovery. Detection and correction of an erroneous codeword at an unknown location in the combined data plus RSEC codeword sequence requires the use of two RSEC characters per damaged codeword. But, if the location of the damaged codewords are known prior to applying the Reed-Solomon error correction process (e.g., for the empty region 130 and dynamic region 140) then only one RSEC codeword is required to recover the correct codeword value of each identified damaged codeword. This leaves additional unused RSEC codewords available for other accidental Data Matrix symbol damage correction. As mentioned above, the 2D barcode of FIG. 5A requires five RSEC codewords while the 2D barcode of FIG. 5B requires four RSEC codewords to correct the empty region 130 of the barcodes. Likewise, both FIGS. 5C and 5D require two RSEC codewords to correct the empty region as both of these barcodes deliberately damage utah "5" and utah "6".

The number of bits which are encoded and the number of utahs deliberately damaged in the process (e.g., the empty region 130 and dynamic region 140) as well as the size of the underlying Data Matrix and its available number of RSEC codewords all affect the visual pattern and image encoding capability.

Methods

Figure 7:
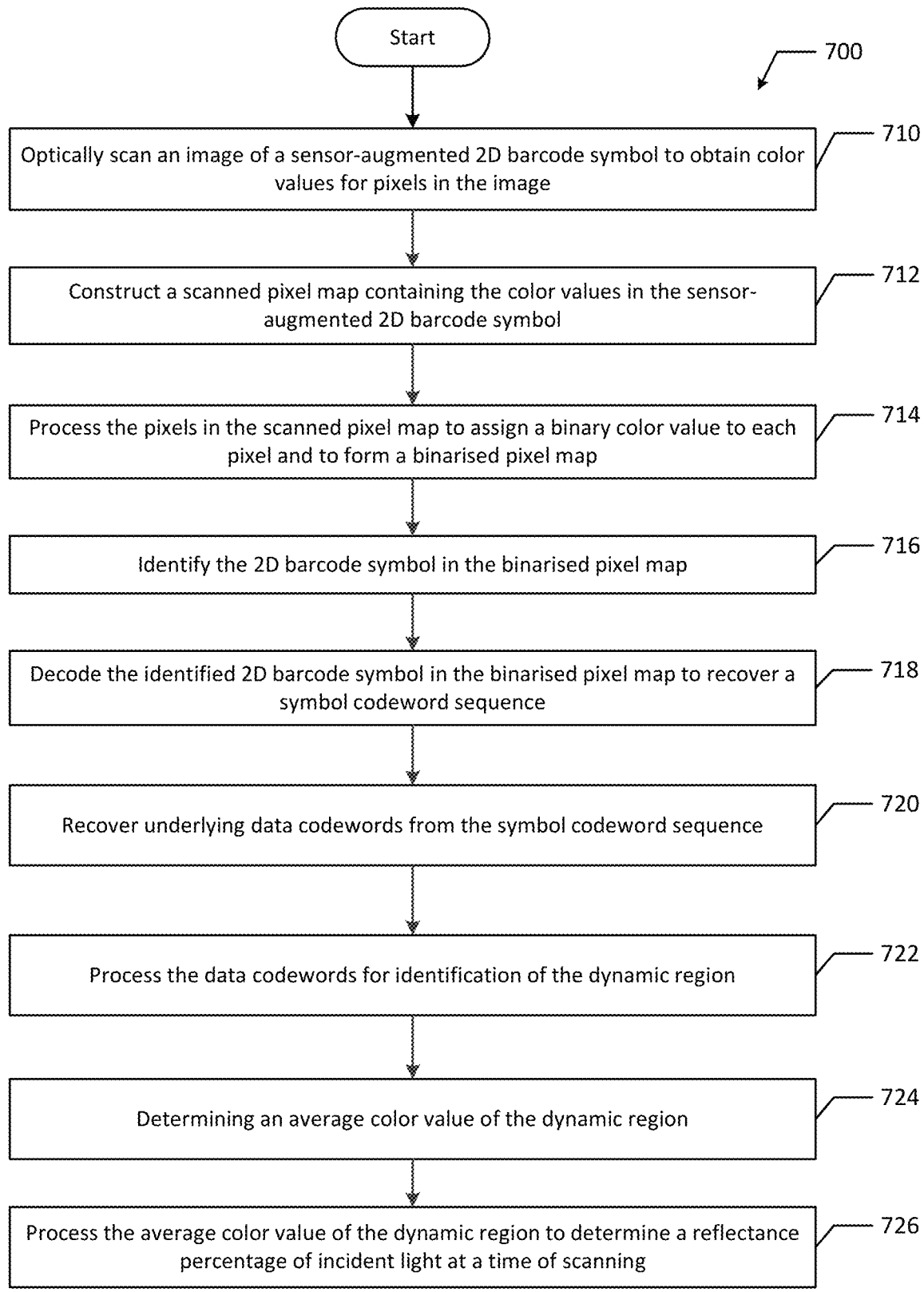
FIG. 7 is a flowchart illustrating an example process for reading a 2D barcode, according to an example embodiment of the present disclosure.

FIG. 7 illustrates a flowchart of an example method 700 for reading a 2D barcode, according to an example embodiment of the present disclosure. Although the example method 700 is described with reference to the flowchart illustrated in FIG. 7, it will be appreciated that many other methods of performing the acts associated with the method 700 may be used. For example, the order of some of the blocks may be changed, certain blocks may be combined with other blocks, blocks may be repeated, and some of the blocks described are optional. The method 700 may be performed by processing logic that may comprise hardware (circuitry, dedicated logic, etc.), software, or a combination of both.

The example method 700 includes optically scanning an image of a sensor augmented 2D barcode symbol (e.g., 2D barcode 100) to obtain color values for pixels in the image (block 710). The 2D barcode and dynamic indicator, such as a time-temperature indicator ("TTI") may be scanned at any point in the supply chain (e.g., using a smartphone carrying a TTI reader App, or other special barcode reader) to ensure that the TTI labeled product has not yet expired. Once the 2D barcode is scanned, and the reflectivity percentage of the dynamic indicator modules determined, the barcode reader device may determine the remaining labeled product life, expended product life, or an expected expiration date. For example, given the remaining product life and the current temperature, the barcode reader may estimate the expiration date of the product if continuously stored at the reference temperature, and additionally if stored at another lower temperature.

Next, method 700 includes constructing a scanned pixel map containing the color values in the sensor augmented 2D barcode symbol (block 712). After scanning and optically processing an image of the sensor-augmented two-dimensional barcode symbol using a barcode imager or color camera using a pixel color identification system such as preferably sRGB, a scanned pixel map may be constructed, the scanned pixel map containing the preferably sRGB color value of the pixels in the scanned modules of the sensor-augmented two-dimensional barcode symbol. The sRGB value of the pixels in the scanned modules contain color contributions from both the barcode region and the dynamic region.

Optionally, the scanning process may include reading of one or more preprinted color calibration patches containing adjacent to or within the sensor-augmented two-dimensional barcode symbol as part of the scanned pixel map. Optionally, these calibration patches may be preprinted as part of the barcode region or dynamic region and may appear either adjacent to or at specific module positions within the sensor-augmented two-dimensional barcode.

Then, method 700 includes processing the pixels in the scanned pixel map to assign a binary color value to each pixel and form a binarised pixel map (block 714). For example, the pixels of the modules in the scanned pixel map are then processed using thresholding algorithm and/or voting algorithms to assigned a binary color value to each pixel, to form an equal-sized binarised pixel map. Additionally, method 700 includes identifying the 2D barcode symbol in the binarised pixel map (block 716). For example, the 2D barcode symbol may be identified from other graphical objects in the binarised pixel map. Next, the method includes decoding the identified 2D barcode symbol in the binarised pixel map to recover a symbol codeword sequence (block 718). For example, the identified 2D barcode may be decoded to construct a symbol codeword sequence from the binarised pixel map. In an example, the color value assignment may utilize the IEC 61966-2-1:1999 standard RGB color space (sRGB).

Method 700 also includes recovering underlying data codewords from the symbol codeword sequence (block 720). Specifically, underlying data codewords may be recovered from the symbol codeword sequence, preferably by utilizing error correction process on the symbol codeword sequence. In an example, the error correction process is Reed-Solomon Error Correction.

Next, the data codewords are processed for identification of the dynamic region (block 722). Processing the data codewords then determines the location, size, and product life equation parameters of the dynamic region, and additionally whether calibration patches are present, and if so their relative location and their reference reflectance value. Method 700 also includes determining an average color value of the dynamic region (block 724). For example, the data codewords are processed for identification of the pixels of the barcode modules in the dynamic region, and the average sRGB color is determined.

After determining the average color value, method 700 includes processing the average color value of the dynamic region to determine a reflectance percentage of incident light at a time of scanning (block 726). Additionally, processing the sRGB color information may optionally include all or some of the steps of: capturing the incident light reflectance of pixels included in the dynamic region, including both environmentally-sensitive pixels and color calibration patches; creating a colored digital light filter effect on reflectance data from the pixels to generate filtered colored image sRGB values; reducing the filtered colored image values to greyscale values and creating a greyscale pixel map; correcting the relationship between greyscale and reflection percentage based on the color calibration patch values; and determining a reflectance percentage of the incident light at the scanning sample time. As used herein, a pixel map may be a map of binary bits (e.g., a bitmap), ternary bits, etc. For example, a pixel map may include greyscale values or RGB color values. Similar to above, greyscale values may be used in place of color values.

In order to obtain the product life data an image sensor such as a smartphone carrying a TTI App reader, may be used to scan the 2D barcode with the embedded dynamic indicator 150. For example, the image may be captured from an image sensor, such as the smartphone camera, using a flash such as a smartphone white flash. The nominally white flash intensity may overwhelm the ambient light and set the color temperature for image capture by the sRGB sensor of the camera. The image sensor may capture the white incident light reflectance of the pixels, including those modules (typically but not necessarily in the invariant area) containing the dynamic indicator. In lieu of the incident light being a specified color a physical color filter may be positioned over the camera lens when the sRGB image is captured. Alternatively, a digital filter may be applied over the sRGB image pixel map to create a colored light filter effect on the reflectance data. As an example, the digital filter may be programmed to process the sRGB image based on an appropriate center wavelength and range, as in a bandpass filter. Then, the filtered color image RGB values may be reduced to a greyscale value (e.g., range 0 to 255) and a greyscale pixel map for the Data Matrix barcode may be created. In an example, the 2D barcode may include encoded data to provide the appropriate inputs and may be used to program a barcode reader for reading color saturation and/or density of the dynamic indicator 150. For example, through encoded data and/or Application Identifiers (AIs), the barcode can automatically program the barcode reader to properly sense color reflectivity of the dynamic indicator 150. The encoded data in the Application Identifiers may also include the appropriate lifetime equation parameters such that the reader can estimate the used and/or remaining product life at a specified temperature for the scanned product.

The greyscale pixel map of the Data Matrix barcode may then be processed, e.g., using a standard Data Matrix procedure, such as ISO 16022 Data Matrix with modifications such as replacing the ISO 15415 Global Threshold algorithm with the Ultracode Color barcode Symbology dual-threshold ternary algorithm to separate pixels into black pixels, white pixels, and color pixels (i.e., pixels neither black nor white). Once the color pixels are separated from the black and white pixels, the remaining black pixels and white pixels may be processed according to the methods of ISO 16022. For example, this processing method identifies the square module positions and the module centers in the Data Matrix pixel map using only the black and white pixels. The ISO 16022 method then decodes the Data Matrix and recovers the AI data (e.g., GS1 AI data).

As discussed above, an Application Identifier may identify the size, shape and/or location of the dynamic indicator modules. Next, as an example, a group of pixels in each identified dynamic indicator module in the invariant area may be sampled; for example, a 3×3 or larger number of pixels at the center of each module may be sampled. As a widely-used example, each pixel value may serve as a vote and the module is categorized as black, white, or color based on a majority vote. In a 3×3 sample, 2 pixels may be voted as black, 6 pixels voted as color, and 1 pixel voted as white. Since 6 is a majority of the 9 total pixels, the module is categorized as color, and the average sRGB color for that module determined by averaging separately the R, G, B values of the 9 pixels voting. The average sensor area sRGB value is formed by averaging separately the R, G, B values of all the identified dye sensor modules. Any color modules found other than the identified sensor modules may be ignored, and Reed-Solomon Error Correction process will recover their underlying data bit value.

It should be appreciated that by using error correction, a dynamic indicator 150 can advantageously be used within a 2D barcode, such as in the invariant area, without affecting the readability of the 2D barcode. Through the use of error correction, such as ISO 16022 Reed-Solomon Error Correction process, which corrects any erroneously identified modules, included in the modules in the dynamic region (e.g., in the invariant area), the underlying Data Matrix is recovered. Thus, data from the underlying Data Matrix is advantageously processed in the standard manner without being corrupted by the continuously changing color of the dynamic indicator 150. Therefore, static product data can be read from the barcode region of the 2D barcode while dynamic product data, such as remaining product life, embedded within the barcode continuously changes due to environmental exposure.

The color modules within the dynamic region are processed to determine the current reflectance percentage $R(t)$ at the time of barcode capture (t). Since the dynamic region is provided within the empty region, the modules in the dynamic region are unaltered by the barcode region (e.g., the modules have not been overprinted with black modules and have not been printed over black modules).

As illustrated in FIG. 8, the reflectance R(t) may be processed to determine equivalent exposure time ($t_e$) at the reference temperature, preferably by using the Arrhenius equation. After determining the equivalent exposure time ($t_e$), the total expended product life to date and the remaining life at the reference temperature can be estimated. Product life may depend on exposure to both time and temperature. For example, with constant exposure to 30° C., product life may be 2.5 weeks. However, with constant exposure to 38° C., product life may only be 1 week, and therefore the cumulative time temperature sensor (e.g., dynamic indicator 150) advantageously indicates cumulative exposure to environmental conditions, which is beneficial when previous storage conditions in the supply chain are unknown. For example, time and temperature conditions of a transportation truck may be unknown, but a cumulative time temperature sensor may advantageously capture and represent this exposure through its change in chemical or physical state (e.g., color state) to allow calculation of the remaining life of the delivered product. Additionally, other calculations based on the equivalent exposure time ($t_e$) may be conducted so the remaining life of the product if stored at a different temperature may also be estimated.

By encoding the 2D barcode with an AI data string containing parameters to automatically program the image processing and provide product equation parameters for pre-stored algorithms, the barcode reader can determine product characteristics that are specific to each 2D barcode labeled product utilizing the same barcode reader. For example, using a reader, the remaining product life for a food product may be determined using the image sensor processing and equation parameters indicated by reading the sensor enhanced 2D barcode on that food product; different parameters may be stored in an AI in the 2D barcode on a vaccine vial and which the same barcode reader may read and use to program the image processing and equation parameters to calculate the remaining life of vaccine in the vial.

In another example, the barcode data may be utilized to check on product authenticity as an anti-counterfeiting measure. For example, all or part of the encoded AI (01) for a GTIN, AI(10) batch number, and AI (21) data may used as validation data form this product instance. This validation data is sent by the reader as a query to the manufacturer's database to see if that validation data is associated there, meaning that the product carrying that barcode has already been registered. If the validation data is not matched in manufacturer's database, or is marked there previously seen, already used or expired, then the authenticity of this product instance just scanned is questionable. A warning code may be placed in the manufacturer's database that multiple instances of the same barcode have been seen, to warn others who may receive another identical product instance that at least one of the products instances is counterfeit.

A method of generating a sensor-augmented two-dimensional barcode symbol 100 may include creating a bitmap of a barcode region 110 and modifying the bitmap to create an empty region 130. For example, the entire barcode bitmap may be created and then the empty region 130 may be defined such that the barcode bitmap is modified to remove any colored static (e.g., black) modules within the empty region 130. Specifically, the Data Matrix's encoded bitmap may be altered to ensure that all bit positions in the empty region 130 are set to '0' or 'empty' prior to conversion to black and empty modules, or alternatively setting all modules to 'empty' in the 5×5 area (e.g., empty region 130) prior to printing the 2D barcode 100. Thus, no modules 120*a-n* in a permanent or static color state (e.g., black modules) are printed in the empty region 130.

When the 2D barcode symbol 100 is generated, the data matrix is encoded with the appropriate modules in the invariant bitmap portion are set to either black or white. The remaining Data Matrix codewords may be filled with pad characters to fill out any available data codewords (e.g., 12 available data codewords for a 16×16 Data Matrix). The last 12 codewords in the symbol (utahs 13-24) may be RSEC error correction codewords. As discussed above, any modules originally set to '1' (e.g., black) in the empty region 130 are changed to '0' (e.g., white) to ensure that the dynamic region 140 is free from overprinted or underprinted static ink.

In another example, the dynamic indicator 150, such as a dynamic ink may be printed in the dynamic region 130 in a first print operation (e.g., at a first time) and then a static ink (e.g., black ink) may be printed in a second operation (e.g., at a second time). The empty region 130 may be formed during the second print operation due to the composition of the dynamic indicator 150. For example, the dynamic indicator 150 may include a chemistry that prevents the static ink from printing over the dynamic indicator 150. In this example, the barcode region 110 may be defined without an empty region 130. Specifically, the Data Matrix's encoded bitmap may be unaltered (e.g., without changing bits positioned in the empty region 130) prior to printing the 2D barcode 100. However, when the static ink is printed, the empty region 130 is formed because the static ink is unable to print over the dynamic indicator 150, which results in a barcode 100 without any static modules in black ink printed within the dynamic region 140. Similarly, the dynamic indicator 150 may block heat or reflect heat (instead of absorbing heat) from a thermal print head, such that the thermal print head is unable to apply static ink within the dynamic region.

In another example, a method of generating a sensor-augmented two-dimensional barcode symbol 100 may include creating a bitmap of a barcode such that the entire bitmap of the barcode region 110 with the empty region 130 is output and ready for printing without further modifications. For example, the empty region 130 may be produced along with the barcode region 110 through the Data Matrix encoding and symbol generation software for the underlying symbol. For example, the Data Matrix's encoded bitmap may include an empty region 130 where all bit positions in the empty region 130 are set to '0' or 'empty'.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. A sensor-augmented two-dimensional barcode, comprising:
a layer provided on a substrate comprising a two-dimensional error-correcting barcode symbol, the bar code symbol further comprising a barcode region and an empty region, the barcode region including a plurality of modules in a static color state and the empty region having an area, the plurality of modules including a plurality of distinct subgroups of modules each associated with a respective codeword, each codeword being one of a data codeword or an error correcting codeword,
wherein the area of the empty region is sized and shaped such that the empty region occupies at most two of the plurality of subgroups of the plurality of modules thereby limiting error correction for the area to error correcting codewords corresponding to the two respective subgroups of the plurality of modules; and
a dynamic region provided on the substrate and positioned within the area of the empty region, the dynamic region comprising a dynamic indicator having a chemistry that is configured, responsive to the occurrence of an environmental condition, to undergo a chemical or physical state change between an initial state and an end state, causing a change in the color state of the dynamic indicator, wherein the color state indicates exposure to the environmental condition.

2. The sensor-augmented two-dimensional barcode of claim 1, wherein the two-dimensional error-correcting barcode symbol is valid when the dynamic indicator is in the initial state.

3. The sensor-augmented two-dimensional barcode of claim 1, wherein the two-dimensional error-correcting barcode symbol is valid when the dynamic indicator is in an intermediate state between the initial state and the end state.

4. The sensor-augmented two-dimensional barcode of claim 1, wherein the two-dimensional error-correcting barcode symbol is valid when the dynamic indicator is in the end state.

5. The sensor-augmented two-dimensional barcode symbol of claim 1, wherein the empty region is positioned in an invariant area of the two-dimensional barcode.

6. The sensor-augmented two-dimensional barcode symbol of claim 5, wherein the empty region is sized and shaped such that the empty region is configured to be corrected by at most two error correcting codewords.

7. The sensor-augmented two-dimensional barcode symbol of claim 6, wherein the empty region is sized and shaped to be corrected by fewer error correcting codewords than the invariant area.

8. The sensor-augmented two-dimensional barcode symbol of claim 1, wherein the dynamic region occupies less than the empty region and the empty region forms a buffer region between the dynamic region and the barcode region.

9. The sensor-augmented two-dimensional barcode symbol of claim 8, wherein the buffer region has the width of at least one module.

10. The sensor-augmented two-dimensional barcode symbol of claim 1, wherein the dynamic region has a shape that is adapted to be visually distinguishable and perceivable by a human user, and wherein the shape provides a human visible indication of a status of the two-dimensional barcode.

11. The sensor-augmented two-dimensional barcode symbol of claim 1, wherein the empty region is configured such that the dynamic region corresponds to a predetermined quantity of modules from a first subgroup of modules and a second subgroup of modules of the at most two of the plurality of subgroups of the plurality of modules, such that the dynamic region forms a contiguous shape completely filling the first subgroup and the second subgroup.

12. The sensor-augmented two-dimensional barcode symbol of claim 1, wherein the environmental condition is selected from the group consisting of time, temperature, and time-temperature product.

13. The sensor-augmented two-dimensional barcode symbol of claim 1, wherein, the dynamic indicator undergoes a continuous chemical or physical state change.

14. The sensor-augmented two-dimensional barcode symbol of claim 13, wherein the dynamic indicator continuously changes color state between the initial state and the end state when exposed to the environmental condition.

15. The sensor-augmented two-dimensional barcode symbol of claim 1, wherein the dynamic indicator is initially in a first color state when unactivated and dynamically changes to a plurality of different color states within a range between the initial state and the end state before reaching the end state.

16. The sensor-augmented two-dimensional barcode symbol of claim 15, wherein the dynamic indicator reaches an intermediate state between the initial state and the end state when the specified condition of the sensed property is beyond a threshold value.

17. The sensor-augmented two-dimensional barcode symbol of claim 15, wherein the dynamic indicator dynamically changes to a plurality of different color states related to one of expended product life and remaining labeled product life.

18. The sensor-augmented two-dimensional barcode symbol of claim 1, wherein the dynamic region provides sensor digital information that is encoded in an invariant pixel map of the two-dimensional symbol.

19. The sensor-augmented two-dimensional barcode symbol of claim 1, wherein the two-dimensional error-correcting barcode includes encoded data identifiers, and wherein, a first data identifier indicates the size and location of the dynamic region and a second Data Identifier indicates product life equation parameters, and wherein the product life equation parameters are Arrhenius equation parameters.

20. The sensor-augmented two-dimensional barcode symbol of claim 19, wherein the first data identifier and the second data identifier are the same data identifier.

21. The sensor-augmented two-dimensional barcode of claim 1, wherein the two-dimensional error-correcting barcode symbol is a DataMatrix symbol.

22. The sensor-augmented two-dimensional barcode of claim 1, wherein a respective subgroup of the plurality of modules is a Utah.

23. The sensor-augmented two-dimensional barcode of claim 1, wherein the at most two respective subgroups of the plurality of modules include a first subgroup and a second subgroup, and wherein the first subgroup and the second subgroup correspond to a single Utah.

24. A sensor-augmented two-dimensional barcode, comprising:
a two-dimensional error-correcting barcode symbol comprising a barcode region and an empty region, the barcode region including a plurality of modules in a static color state occupying a first area and the empty region occupying a second area, wherein the plurality of modules include a plurality of distinct subgroups of modules each associated with a respective codeword, each codeword being one of a data codeword or an error correcting codeword; and a dynamic region positioned within the second area of the empty region and occupying at least a portion of the second area, the dynamic region comprising a dynamic indicator having a chemistry that is configured, responsive to the occurrence of an environmental condition, to undergo a chemical or physical state change between an initial state and an end state, causing a change in the color state of the dynamic indicator, wherein the color state indicates exposure to the environmental condition, and wherein the second area is sized and shaped such that the second area (i) occupies at least 24 square modules and (ii) occupies at most four respective subgroups of the plurality of subgroups thereby limiting error correction for the second area to error correcting codewords corresponding to the at most four respective subgroups.

25. The sensor-augmented two-dimensional barcode of claim 24, wherein the first area is between a range of 100 square modules and 20,736 square modules.

26. The sensor-augmented two-dimensional barcode of claim 24, wherein the second area is sized and shaped such that the empty region occupies at most a first subgroup of modules and a second subgroup of modules thereby limiting error correction for the second area to error correcting codewords corresponding to the first subgroup of modules and the second subgroup of modules.

27. The sensor-augmented two-dimensional barcode of claim 24, wherein the second area of dynamic region is the minimum area to accommodate a VVM, and wherein the first area is the minimum area to accommodate error correction for the second area.

28. A method of reading of a sensor-augmented two-dimensional barcode symbol comprising:

optically scanning an image of the sensor-augmented two-dimensional barcode symbol to obtain color values for pixels in the image, wherein the two-dimensional barcode symbol includes a layer with a barcode region, an empty region having an area, and a dynamic region, wherein the dynamic region is provided within the area of the empty region, the barcode region includes a plurality of modules and the plurality of modules includes a plurality of distinct subgroups of modules each associated with a respective codeword, each codeword being one of a data codeword or an error correcting codeword, and wherein the area of the empty region is sized and shaped such that the empty region occupies at most two of the plurality of subgroups of the plurality of modules thereby limiting error correction for the area to error correcting codewords corresponding to the two respective subgroups of the plurality of modules;

constructing a scanned pixel map containing the color values in the sensor-augmented two-dimensional barcode symbol;

processing the pixels in the scanned pixel map to assign a binary color value to each pixel and to form a binarised pixel map;

identifying the two-dimensional barcode symbol in the binarised pixel map;

decoding the identified two-dimensional barcode symbol in the binarised pixel map to recover a symbol codeword sequence;

recovering underlying data codewords from the symbol codeword sequence, by utilizing error correction process on the symbol codeword sequence;

processing the data codewords for identification of the dynamic region using at most two error correcting codewords corresponding to the at most two of the plurality of subgroups of the plurality of modules;

determining an average color value of the dynamic region; and processing the average color value of the dynamic region to determine a reflectance percentage of incident light at a time of scanning.

29. The method of claim 28, wherein processing color information includes:

capturing white light reflectance of pixels included in the dynamic region; and creating a colored light filter effect on reflectance data from the scanned pixels utilizing a optical or digital filter to generate filtered colored image values of the pixels in a scanned pixel map.

30. The method of claim 29, wherein processing color information further includes:

reducing the filtered colored image values in the scanned pixel map to greyscale values;

determining an average greyscale value of the average color value of the barcode modules; and processing the average grey value to determine the incident light reflectance percentage at the time of scanning.

31. The method of claim 28, wherein processing the pixels in the scanned pixel map includes classifying each pixel as one of a black pixel, a white pixel, and a color pixel.

32. The method of claim 31, wherein the black pixels, the white pixels, and the color pixels are used to form a ternarised pixel map, and the black and white pixels in the ternarised pixel map are used to identify the two-dimensional barcode symbol in the ternarised pixel map.

33. The method of claim 28, wherein an optical bandpass filter is used when scanning the image to create the effect of monochrome illumination.

34. The method of claim 28, wherein a light source is used to optically scan the image, the light source being a monochrome light source, and wherein the monochrome light source is a monochrome laser.

35. The method of claim 28, wherein a barcode imager is used to optically scan the image, and wherein the barcode imager is responsive only to greyscale values.

36. A method of generating a sensor-augmented two-dimensional barcode symbol comprising:

creating a bitmap of a barcode region of a two-dimensional error-correcting barcode symbol, wherein the barcode region includes a plurality of modules and the plurality of modules includes a plurality of distinct subgroups of modules each associated with a respective codeword, each codeword being one of a data codeword or an error correcting codeword;

modifying the bitmap to create an empty region having an area within the barcode region such that the empty region is sized and shaped to occupy respective bits in the bitmap from at most two of the plurality of subgroups of the plurality of modules thereby limiting error correction for the area to error correcting codewords corresponding to the two respective subgroups of the plurality of modules; and generating the two-dimensional error-correcting barcode symbol with the barcode region and the empty region, wherein the empty region is designated for a dynamic region positioned within the area of the empty region, the dynamic region comprising a dynamic indicator having a chemistry that is configured, responsive to the occurrence of an environmental condition, to undergo a chemical or physical state change between an initial state and an end state, causing a change in the color state of the dynamic indicator, wherein the color state indicates exposure to the environmental condition.

37. The method of claim 36, further comprising printing the generated two-dimensional error-correcting barcode symbol.

38. The method of claim 37, wherein the barcode region is printed after the dynamic indicator.

39. The method of claim 37, wherein the barcode region is printed before the dynamic indicator.

40. The method of claim 36, wherein at least a portion of the barcode region and at least a portion of the dynamic indicator are printed during the same printing step.

41. A method of generating a sensor-augmented two-dimensional barcode symbol comprising:

creating a bitmap of a two-dimensional error-correcting barcode symbol such that the barcode symbol includes a barcode region and an empty region, wherein the barcode region is configured to include a plurality of modules, and the plurality of modules includes a plurality of distinct subgroups of modules each associated with a respective codeword, each codeword being one of a data codeword or an error correcting codeword; and generating the two-dimensional error-correcting barcode symbol with the barcode region and the empty region, wherein the empty region is designated for a dynamic region positioned within the area of the empty region, the dynamic region comprising a dynamic indicator having a chemistry that is configured, responsive to the occurrence of an environmental condition, to undergo a chemical or physical state change between an initial state and an end state, causing a change in the color state of the dynamic indicator, wherein the color state indicates exposure to the environmental condition, wherein the area of the empty region is sized and shaped such that the empty region occupies at most two of the plurality of subgroups of the plurality of modules thereby limiting error correction for the area to error correcting codewords corresponding to the two respective subgroups of the plurality of modules.

* * * * *